(12) United States Patent
Takahashi et al.

(10) Patent No.: US 8,159,593 B2
(45) Date of Patent: Apr. 17, 2012

(54) DISPLAY APPARATUS WITH A SINGLE DETECTION OBJECT FOR DETERMINING OPEN/CLOSE AND INVERSION OF THE DISPLAY

(75) Inventors: Makoto Takahashi, Aichi (JP); Toshihide Hanajima, Aichi (JP)

(73) Assignee: Sony Corporation (JP)

( * ) Notice: Subject to any disclaimer, the term of this patent is extended or adjusted under 35 U.S.C. 154(b) by 324 days.

(21) Appl. No.: 12/386,092

(22) Filed: Apr. 14, 2009

(65) Prior Publication Data

US 2009/0295975 A1 Dec. 3, 2009

(30) Foreign Application Priority Data

Apr. 16, 2008 (JP) ................ P2008-106902

(51) Int. Cl.
*H04N 5/222* (2006.01)
*H04N 5/225* (2006.01)
*G03B 13/02* (2006.01)

(52) U.S. Cl. .............. 348/333.06; 348/374; 396/374; 396/383

(58) Field of Classification Search .......... 348/333.01, 348/333.06, 333.07, 333.13, 373–376; 396/374, 396/383; 352/242, 243; 455/566, 575.3
See application file for complete search history.

(56) References Cited

U.S. PATENT DOCUMENTS

| | | | |
|---|---|---|---|
| 5,739,859 A | | 4/1998 | Hattori et al. |
| 6,518,956 B1 * | | 2/2003 | Sato ............................ 345/173 |
| 7,245,948 B2 * | | 7/2007 | Jung et al. ................. 455/575.1 |
| 2004/0185920 A1 | | 9/2004 | Choi et al. |
| 2004/0192220 A1 * | | 9/2004 | Huang et al. ................... 455/74 |
| 2005/0136970 A1 * | | 6/2005 | Kim ........................... 455/550.1 |
| 2005/0248678 A1 * | | 11/2005 | Kawai et al. ............. 348/333.06 |
| 2006/0148540 A1 * | | 7/2006 | Satoh et al. ................ 455/575.3 |

FOREIGN PATENT DOCUMENTS

| | | |
|---|---|---|
| CN | 1523915 A | 8/2004 |
| JP | 08-125890 A | 5/1996 |
| JP | 10290385 A | 10/1998 |
| JP | 2001-051799 A | 2/2001 |
| JP | 2004-184293 A | 7/2004 |
| JP | 2006038777 A | 2/2006 |

OTHER PUBLICATIONS

Office Action from Japanese Application No. 2008-106902, dated Mar. 2, 2010.
Office Action from Chinese Application No. CN 200910132742.9, dated Jul. 2, 2010.

* cited by examiner

*Primary Examiner* — Daniel M Pasiewicz
(74) *Attorney, Agent, or Firm* — Lerner, David, Littenberg, Krumholz & Mentlik, LLP

(57) ABSTRACT

A display apparatus includes a hinge unit that couples a display unit to an apparatus body rotatably around first and second rotational axes along different directions. When the display unit and the hinge unit are rotated together around the first rotation axis, the display unit is opened or closed with respect to the apparatus body. When the display unit is rotated with respect to the hinge unit, the display unit inverted or not inverted. A single detection object is provided in the hinge unit. An open/close detection sensor at a position deviated from the first rotation axis detects an open/close state of the display unit in accordance with a positional relationship relative to the detection object. An inversion detection sensor at a position deviated from the second rotation axis detects whether the display unit is inverted or not in accordance with a positional relationship relative to the detection object.

9 Claims, 17 Drawing Sheets

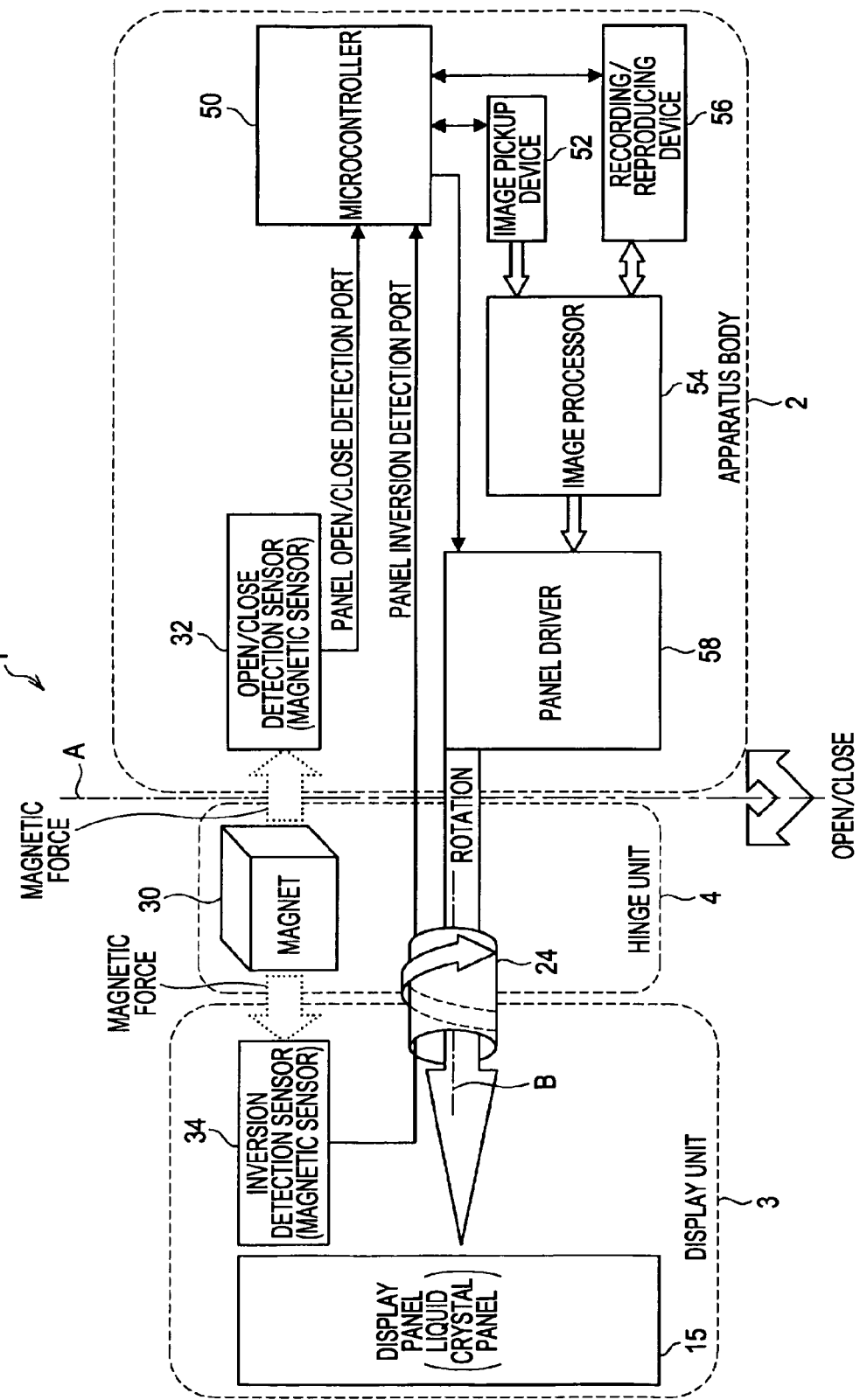

FIG. 11

| ROTATION STATE OF DISPLAY UNIT | OPEN/CLOSE DETECTION SENSOR | INVERSION DETECTION SENSOR | DISPLAY MODE OF DISPLAY UNIT |
|---|---|---|---|
| (1) NON-INVERTED AND CLOSED STATE | Hi | Low | NON-DISPLAY MODE (PANEL LIGHT-OFF) |
| (2) NON-INVERTED AND OPEN STATE | Low | Low | NORMAL DISPLAY MODE |
| (3) OPEN AND INVERTED STATE | Low | Hi | UP/DOWN INVERTED DISPLAY MODE (MIRROR DISPLAY) |
| (4) INVERTED AND CLOSED STATE | Hi | Hi | UP/DOWN AND LEFT/RIGHT INVERTED DISPLAY MODE |

DISPLAY APPARATUS WITH A SINGLE DETECTION OBJECT FOR DETERMINING OPEN/CLOSE AND INVERSION OF THE DISPLAY

The present application claims priority from Japanese Patent Application No. JP 2008-106902, filed in the Japanese Patent Office on Apr. 16, 2008, the entire content of which is incorporated herein by reference.

BACKGROUND OF THE INVENTION

1. Field of the Invention

The present invention relates to display apparatuses, and more particularly to a display apparatus that can detect a rotation state of a display unit with respect to an apparatus body by a simple structure.

2. Description of the Related Art

Video cameras, potable phones, etc., with openable/closable display panels are popular. Some of such video cameras have a structure in which a display panel is rotatable (invertible) around a second rotation axis different from a first rotation axis for opening/closing the display panel so that a user easily views a display screen depending on the purpose of use.

To detect an open/close state and an inversion state of the display panel, a mechanical switch is typically used. The mechanical switch switches an electrical connection in accordance with a mechanical operation. The mechanical switch mechanically detects the open/close state and the inversion state of the display panel, and outputs an on/off signal, as a detected result, to an input port of a microcontroller. The microcontroller receives the on/off signal from the mechanical switch, and controls various operations, for example, a display mode, of the video camera. In particular, for example, the microcontroller turns ON the light of the display panel when receiving a signal indicating that the display panel is open, whereas the microcontroller turns OFF the light of the display panel when receiving a signal indicating that the display panel is closed. Also, the microcontroller controls the display panel such that an image is displayed in a mirror state by inverting the image in up/down and left/right directions when receiving a signal indicating that the display panel is inverted to provide easy viewing for a person facing the display panel. Further, when the display panel is closed while being inverted, the microcontroller controls the display panel such that the image is displayed in a normal state by returning the left/right inverted display to the original state while keeping the up/down inverted display.

However, with the above-described configuration using the mechanical switch, an on point or an off point of the mechanical switch may be deviated due to a tolerance of a part, an assembly tolerance of the apparatus, or a variation of a mount position of the switch. It is difficult to adjust the mechanical switch for providing a normal operation. In addition, when the mechanical switch is used, a mechanical structure of the apparatus becomes complicated, a dimensional tolerance becomes limited, and the assembly of the apparatus becomes troublesome.

To address the problems, for example, Japanese Unexamined Patent Application Publication No. 2004-184293 discloses a method of using a magnetic sensor instead of the mechanical switch, and detecting an open/close state of a display panel on the basis of relative positions of a magnet and the magnetic sensor. Using such a magnetic sensor, the above-mentioned problems resulted from the complicated structure of the mechanical switch are addressed.

SUMMARY OF THE INVENTION

However, to detect a plurality of states of the display panel, for example, states in two directions such as an open/close state and an inversion state of the display panel, the detection mechanism disclosed in Japanese Unexamined Patent Application Publication No. 2004-184293 has to include two pairs of magnetic sensors and magnets for open/close detection and inversion detection. Since the two magnetic sensors and the two magnets are provided, the apparatus structure becomes complicated, the number of parts increases, and a manufacturing cost increases. Even when a magnetic sensor is used for detecting one of the states and a mechanical sensor is used for detecting the other of the states, the necessity of a plurality of pairs of detection mechanism still remains. The apparatus structure still becomes complicated, the number of parts still increases, and the manufacturing cost still increases.

It is desirable to provide a new and improved display apparatus that can detect states in two directions of the display apparatus by a further simple structure.

A display apparatus according to an embodiment of the present invention is provided which includes an apparatus body; a display unit that displays an image on a display screen; a hinge unit that couples the display unit to the apparatus body rotatably around first and second rotation axes along different directions; a single detection object arranged at a position near the first and second rotation axes but deviated from the first and second rotation axes; an open/close detection sensor provided in one of the display unit and the apparatus body at a position deviated from the first rotation axis, the open/close detection sensor detecting an open/close state of the display unit around the first rotation axis in accordance with a positional relationship relative to the detection object, the display unit being opened or closed by being rotated with respect to the apparatus body; and an inversion detection sensor provided in the other of the display unit and the apparatus body at a position deviated from the second rotation axis, the inversion detection sensor detecting, when the display unit is closed with respect to the apparatus body, whether an inversion state of the display unit is a non-inverted state, in which the display screen of the display unit faces the apparatus body, or an inverted state, in which the display screen faces a side opposite to the apparatus body, with respect to the apparatus body around the second rotation axis in accordance with a positional relationship relative to the detection object.

A display apparatus according to another embodiment of the present invention is provided which includes an apparatus body; a display unit that displays an image on a display screen; and a hinge unit that couples the display unit to the apparatus body rotatably around first and second rotation axes along different directions. The display unit is openable/closable with respect to the apparatus body when the display unit and the hinge unit are rotated together with respect to the apparatus body around the first rotation axis. The display unit can be in a non-inverted state, in which the display screen of the display unit faces the apparatus body, or in an inverted state, in which the display unit faces a side opposite to the apparatus body, when the display unit is rotated with respect to the apparatus body by rotating the display unit with respect to the hinge unit around the second rotation axis and the display unit is closed with respect to the apparatus body. A single detection object is provided at a position close to or distant from the apparatus body in accordance with opening/ closing of the display unit. An open/close detection sensor is provided in the apparatus body at a position deviated from the first rotation axis, the open/close detection sensor detecting the open/close state of the display unit in accordance with a positional relationship relative to the detection object. An inversion detection sensor, which is moved together with the display unit, is provided at a position deviated from the second rotation axis, the inversion detection sensor detecting whether the display unit is in the non-inverted state or the inverted state in accordance with a positional relationship relative to the detection object.

A control device may be further provided. The control device determines a rotation state of the display unit with respect to the apparatus body around the first and second rotation axes on the basis of detected results of the open/close detection sensor and the inversion detection sensor, and controls a display mode of the display unit on the basis of a determined result.

The control device may determine the state of the display unit from states of a first state in which the display unit is closed and not inverted, a second state in which the display unit is open and not inverted, and a third state in which the display unit is open and inverted.

The control device may set the display mode of the display unit to a non-display mode in which the image is not displayed when the display unit is in the first state. The control device may set the display mode of the display unit to a normal display mode in which the image is directly displayed when the display unit is in the second state. The control device may set the display mode of the display unit to an up/down inverted display mode in which the image is inverted in an up/down direction and displayed when the display unit is in the third state.

The control device may determine the state of the display unit from states of a first state in which the display unit is closed and not inverted, a second state in which the display unit is open and not inverted, and a fourth state in which the display unit is closed and inverted.

The control device may set the display mode of the display unit to a non-display mode in which the image is not displayed when the display unit is in the first state. The control device may set the display mode of the display unit to a normal display mode in which the image is directly displayed when the display unit is in the second state. The control device may set the display mode of the display unit to an up/down and left/right inverted display mode in which the image is inverted in up/down and left/right directions when the display unit is in the fourth state.

The detection object may be a magnet. The open/close detection sensor and the inversion detection sensor may be magnetic sensors that detect a magnetic flux from the magnet.

The detection object may be a light source. The open/close detection sensor and the inversion detection sensor may be optical sensors that detect light from the light source.

With the above configuration, in the display apparatus in which the display unit is coupled to the apparatus body rotatably around the first and second rotation axes along the different directions, the open/close detection sensor detects the open/close state of the display unit around the first rotation axis in accordance with the positional relationship relative to the detection object, the display unit being opened or closed by being rotated with respect to the apparatus body, and the inversion detection sensor detects the inversion state of the display unit with respect to the apparatus body around the second rotation axis in accordance with the positional relationship relative to the detection object, the inversion detection unit detecting, when the display unit is closed with respect to the apparatus body, whether the inversion state is the non-inverted state, in which the display screen of the display unit faces the apparatus body, or the inverted state, in which the display screen faces the side opposite to the apparatus body.

With the above configuration, the state of the display apparatus in the two directions can be easily detected with the simple structure.

BRIEF DESCRIPTION OF THE DRAWINGS

FIG. 10 is a block diagram showing a schematic configuration of the video camera according to the embodiment;

FIG. 11 is an explanatory view showing a relationship between a detected result of a rotation state of the display unit and a display mode according to the embodiment;

DESCRIPTION OF THE PREFERRED EMBODIMENTS

Preferred embodiments of the present invention are described below in detail with reference to the attached drawings. In the specification and drawings, equivalent numerals are applied to components having substantially equivalent functions and structures to omit redundant description.

First Embodiment

First, a display apparatus according to a first embodiment of the present invention is described. The display apparatus of this embodiment is a display apparatus in which a display unit is coupled to an apparatus body through a hinge unit such that the display unit is rotatable in two-axis directions with respect to the apparatus body. The display apparatus may be applied to various electronic apparatuses such as a video camera, a digital camera, a portable phone, a personal digital assistant (PDA), a portable video game machine, an electronic dictionary, various portable terminals, a notebook computer, etc., as long as the electronic apparatuses each include a display unit openable/closable and rotatable with respect to an apparatus body. In the following description, a video camera is described as an example of an electronic apparatus to which the display apparatus of the present invention is applied; however, the present invention is not limited to the example.

Figure 1:
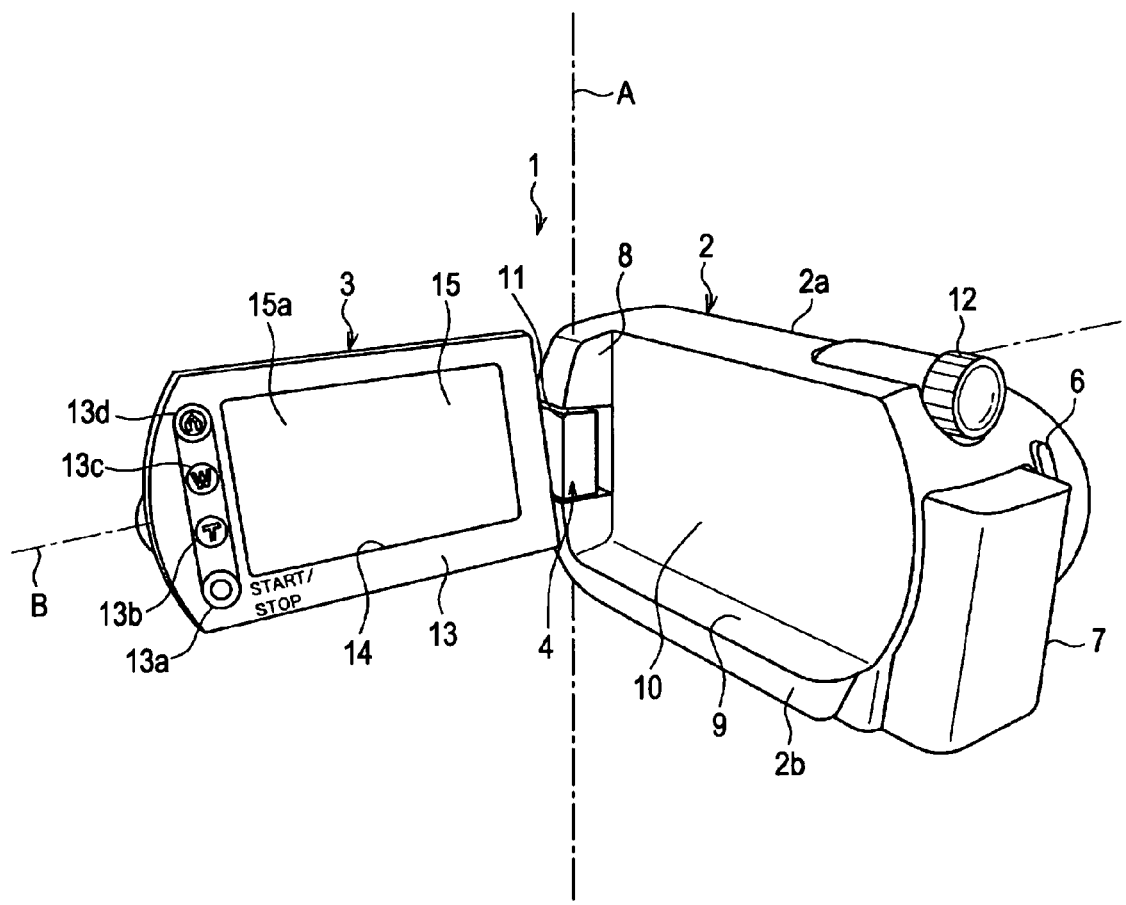
FIG. 1 is a perspective view showing an open state of a display unit of a video camera according to a first embodiment of the present invention.
Figure 2:
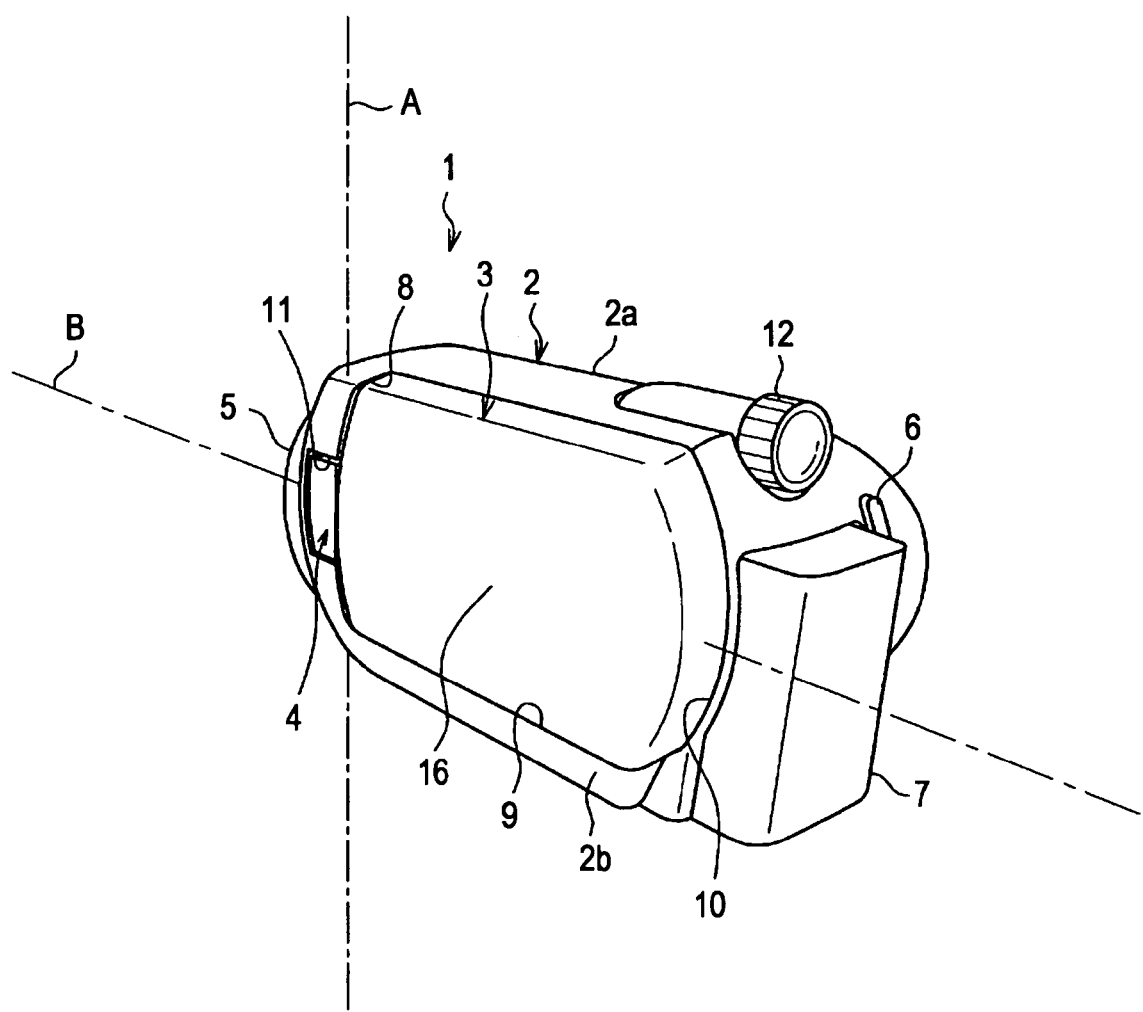
FIG. 2 is a perspective view showing a closed state of the display unit of the video camera according to the embodiment.
Figure 3:
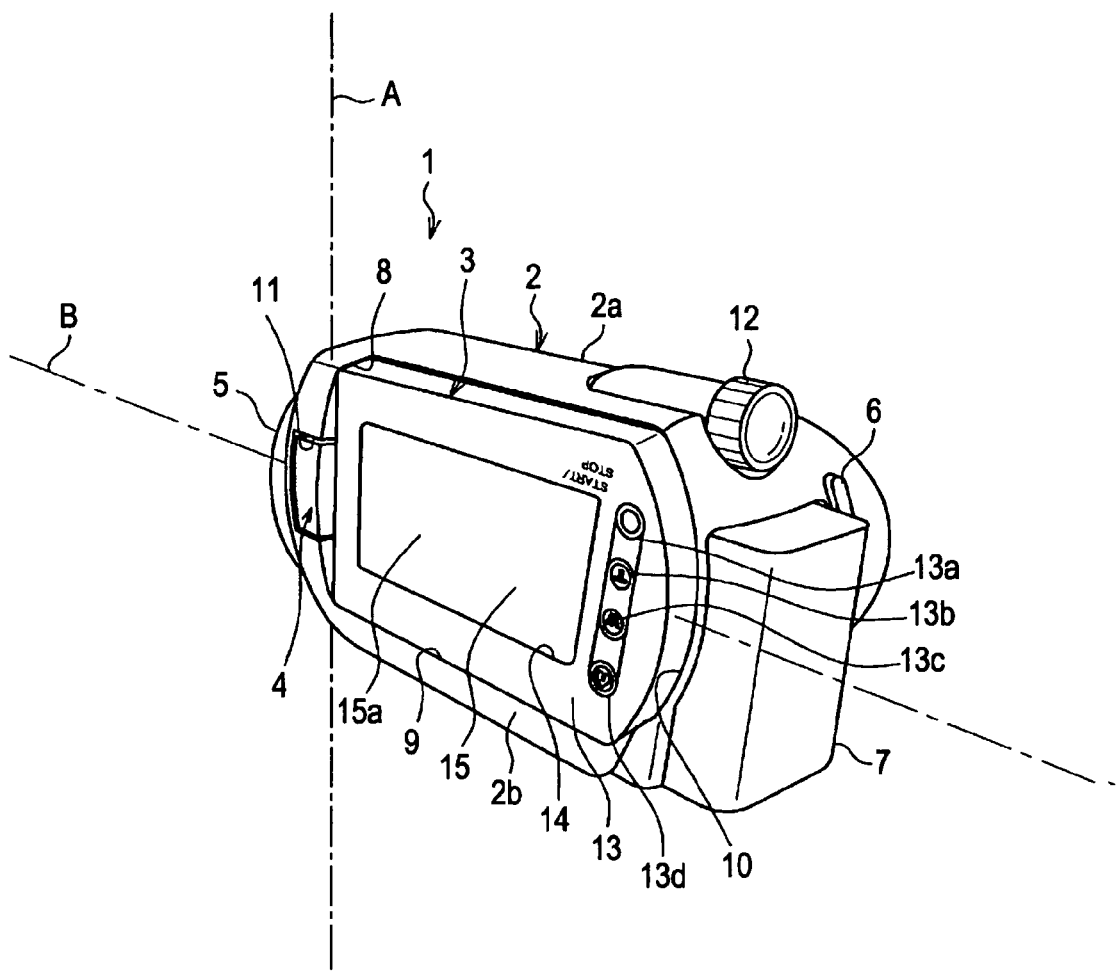
FIG. 3 is a perspective view showing an inverted and closed state of the display unit of the video camera according to the embodiment.

Referring to FIGS. 1 to 3, a general configuration of a video camera 1 according to this embodiment is described. FIGS. 1 to 3 are perspective views of the video camera 1 of this embodiment. FIG. 1 illustrates an open state of a display unit 3, FIG. 2 illustrates a closed state of the display unit 3, and FIG. 3 illustrates an inverted and closed state of the display unit 3.

Referring to FIGS. 1 to 3, the video camera 1 of this embodiment is a portable image pickup apparatus that records a movie of an object while being held by a user with his/her single hand. The video camera 1 includes an apparatus body 2, a display unit 3, and a hinge unit 4 that couples the display unit 3 to the apparatus body 2 in an openable/closable and rotatable manner with respect to the apparatus body 2.

In the apparatus body 2 of the video camera 1, for example, an image pickup device (not shown) that captures an image of the object, an image processor (not shown) that processes an image signal obtained through the image capturing, a recording/reproducing device (not shown) that records and/or reproduces captured image data on/from a recording medium, an operation unit (not shown) that receives a user input, a control unit (not shown) formed of a microcontroller or the like, and a display unit such as a small viewfinder 12.

A casing of the apparatus body 2 of the video camera 1 is made of, for example, synthetic resin. An object-image taking lens 5 and a built-in microphone are provided at a front side surface. A start/stop switch 6 for an image capturing operation and a detachable battery 7 are provided at a rear side surface. A grip belt (not shown) with which the user holds the video camera 1 with his/her hand is provided at a right side surface 2a of the apparatus body 2. Step portions 8 and 9 are formed at front and lower portions of a left side surface 2b of the apparatus body 2, thereby forming a recessed portion 10 open to left, rear, and upper sides. A housing recess 11 is formed at an intermediate position of the step portion 8 in an up/down direction. The housing recess 11 occupies an approximately one third of a width in the up/down direction of the recessed portion 10 and extends toward the front side of the apparatus. The housing recess 11 functions as a housing portion for housing the hinge unit 4 (described later).

The display unit 3 is a display apparatus of, for example, a substantially rectangular plate as a whole. The display unit 3 functions as an electronic viewfinder by which the user checks a captured image and the like. The display unit 3 includes a frame body 13, a display panel 15, and a rear face cover 16. The frame body 13 is made of synthetic resin and having a horizontally long rectangular opening 14 at a center portion thereof. The display panel 15 is, for example, a liquid crystal display (LCD) panel or an organic electroluminescence (EL) display panel. The display panel 15 displays display data including a captured image, a reproduced image, or various setting information items input from the apparatus body 2. The display panel 15 is fixed to the frame body 13 from a rear surface of the frame body 13. A rear surface of the display panel 15 is covered with the rear face cover 16. Accordingly, the display panel 15 is arranged between the frame body 13 and the rear face cover 16, and a display screen 15a is exposed through the opening 14. For example, a start/stop button 13a for an image capturing operation, a Tele (zoom-in) button 13b and a Wide (zoom-out) button 13c for zoom adjustment, and a home menu button 13d are provided at a side of the frame body 13 arranged at a front surface of the display unit 3.

The display unit 3 is coupled to the outside of the apparatus body 2 through the hinge unit 4. The hinge unit 4 is a coupling unit made of metal or resin to couple the display unit 3 to the apparatus body 2 and to support the display unit 3 in a manner rotatable in two-axis directions (i.e., in a manner openable/closable and rotatable) with respect to the apparatus body 2. The hinge unit 4 allows the display unit 3 to be horizontally rotated (i.e., open/close operation) around a first rotation axis A (open/close rotation axis) and to be rotated (i.e., inversion operation) around a second rotation axis B (inversion rotation axis) in a direction orthogonal to the first rotation axis A.

Specifically, the hinge unit 4 supports an edge of the display unit 3 rotatably around the first rotation axis A. Accordingly, the display unit 3 can be opened by about 90° with respect to the left side surface 2b of the apparatus body 2 while another edge of the display unit 3 moves away from the recessed portion 10 of the left side surface 2b of the apparatus body 2. That is, the display unit 3 can be opened or closed with respect to the apparatus body 2 around the first rotation axis A. At this time, the display unit 3 and the hinge unit 4 are rotated as an integrated member with respect to the apparatus body 2 around the first rotation axis A. A rotation angle $\alpha$ of the display unit 3 around the first rotation axis A is limited within a rotation range such that a maximum rotation angle is, for example, about 90° with reference to a closed state ($\alpha=0°$). FIG. 1 illustrates an open state ($\alpha=90°$) of the display unit 3 with respect to the apparatus body 2, and FIG. 2 illustrates the closed state ($\alpha=0°$) of the display unit 3 with respect to the apparatus body 2.

In the following description, with reference to the closed state ($\alpha=0°$), as shown in FIG. 2, the display unit 3 is determined as the open state when the rotation angle $\alpha$ of the display unit 3 around the first rotation axis A is a predetermined angle $\alpha 0$ or greater (for example, when $\alpha 0=30°$, $\alpha \geq 30°$), whereas the display unit 3 is determined as the closed state when the rotation angle $\alpha$ is smaller than the predetermined rotation angle $\alpha 0$ (for example, $\alpha < 30°$).

Also, the hinge unit 4 supports the display unit 3 rotatably around the second rotation axis B orthogonal to the first rotation axis A. By rotating the display unit 3 with respect to the hinge unit 4 around the second rotation axis B, the display unit 3 can be rotated (inverted) with respect to the apparatus body 2. Accordingly, when the display unit 3 is closed with respect to the apparatus body 2, the display unit 3 can be in a non-inverted state (state in FIG. 2) in which the display screen 15a of the display unit 3 faces the apparatus body 2 (inside), or an inverted state (state in FIG. 3) in which the display unit 3 faces a side opposite to the apparatus body 2 (outside).

In the following description with reference to the open state ($\beta=0°$) as shown in FIG. 1, the display unit 3 is determined as the inverted state when a rotation angle $\beta$ of the display unit 3 around the second rotation axis B is a predetermined angle $\alpha 0$ or greater (for example, when α0=120°, β≦−120°, β≧120°), whereas the display unit 3 is determined as the non-inverted state when the rotation angle β is smaller than the predetermined rotation angle β0 (for example, −120°<β<120°). If the rotation angle β of the display unit 3 around the second rotation axis B is limited within a predetermined angle range (for example, −90°≦β≦180°), wires arranged through the hinge unit 4 can be prevented from being twisted or broken.

Figure 4:
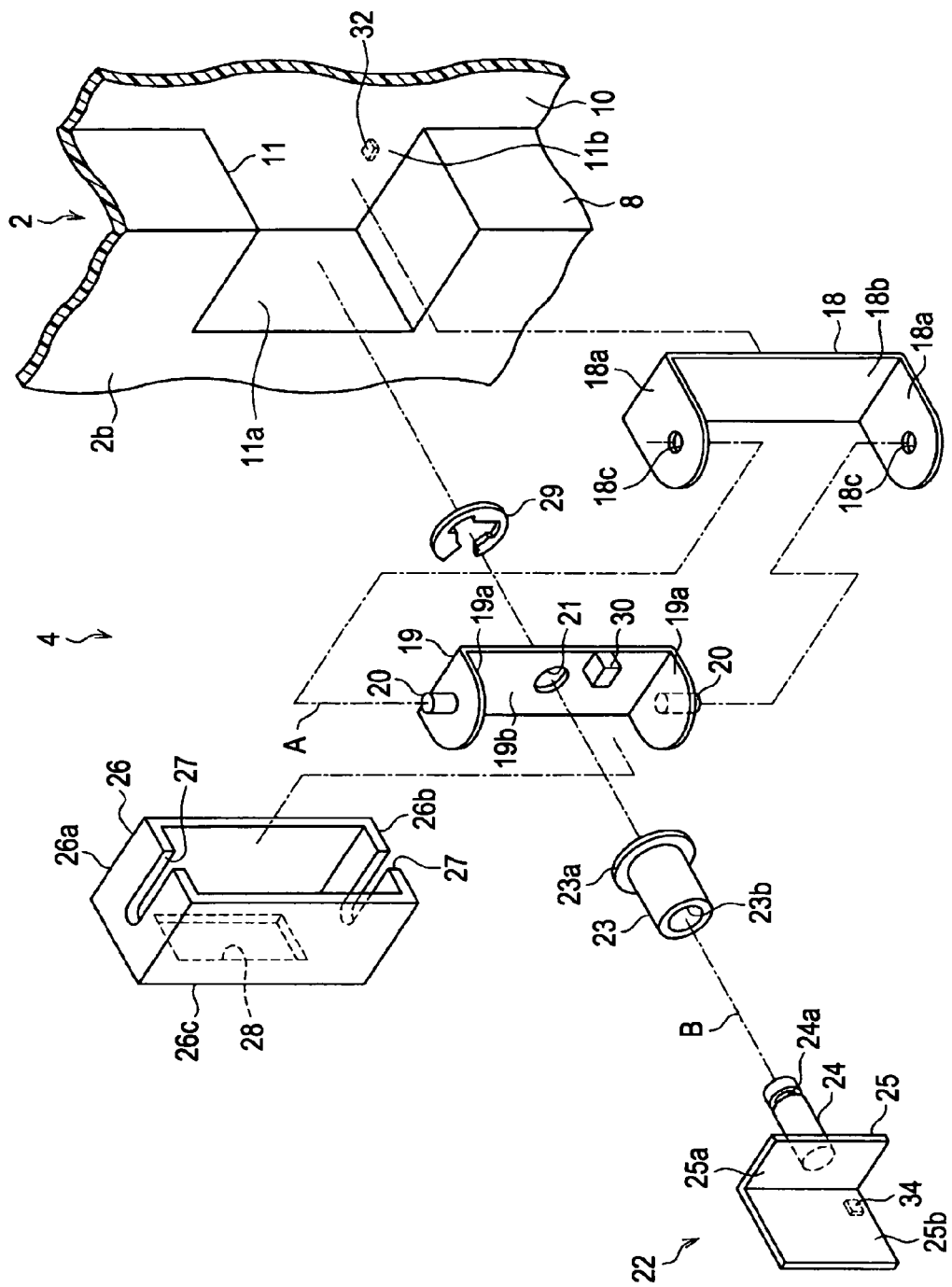
FIG. 4 is an exploded perspective view showing a primary portion of a hinge unit according to the embodiment.
Figure 5:
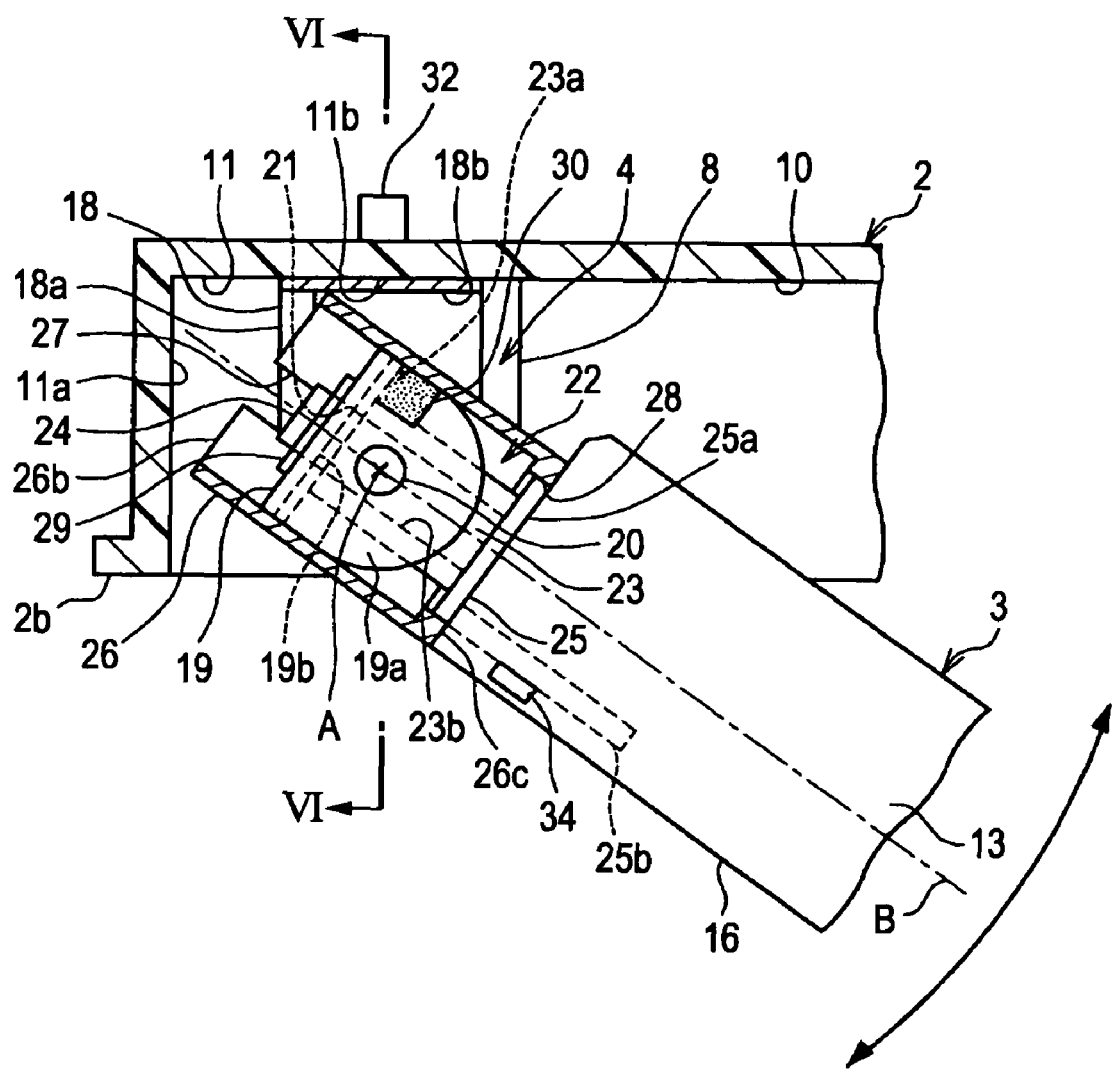
FIG. 5 is an enlarged horizontal sectional view showing the primary portion in FIG. 4.
Figure 6:
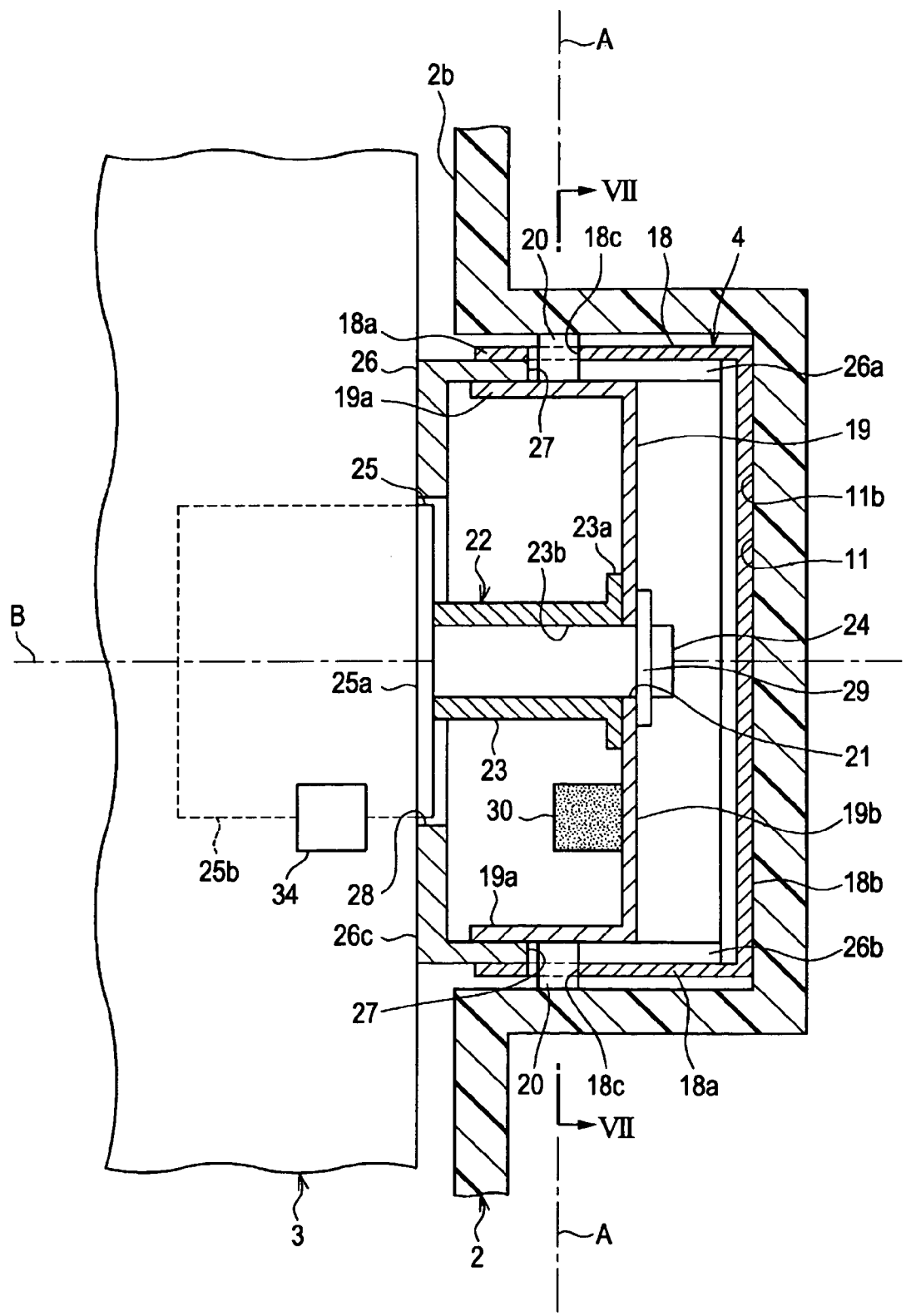
FIG. 6 is a sectional view taken along line VI-VI in FIG. 5.
Figure 7:
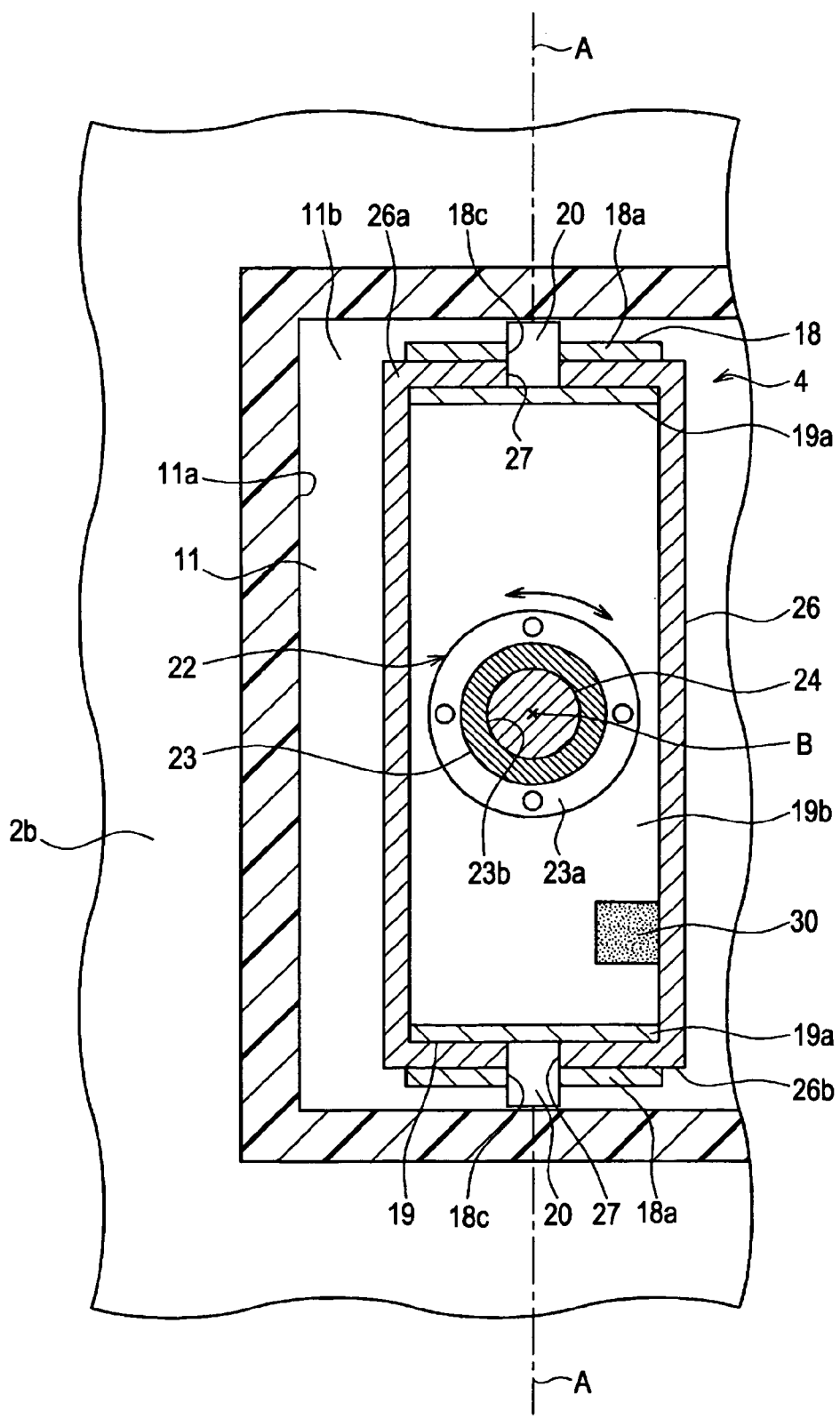
FIG. 7 is a sectional view taken along line VII-VII in FIG. 6.

Here, referring to FIGS. 4 to 7, the structure of the hinge unit 4 that rotatably couples the display unit 3 to the apparatus body 2 according to this embodiment is described in more detail. FIG. 4 is an exploded perspective view showing a primary portion of the hinge unit 4 of this embodiment, FIG. 5 is an enlarged horizontal sectional view showing the primary portion in FIG. 4, FIG. 6 is a sectional view taken along line VI-VI in FIG. 5, and FIG. 7 is a sectional view taken along line VII-VII in FIG. 6.

Referring to FIGS. 4 to 7, the hinge unit 4 includes an open/close bracket 18, an open/close hinge unit 19, rotation shafts 20, a rotary unit 22 including a base portion 23 and a shaft member 24, an attachment bracket 25, a cover body 26, and an e-ring 29.

The open/close bracket 18 is formed by bending a metal plate to have a substantially angular C-shaped section. Horizontally extending, upper and lower end portions are rounded at outer edges thereof, and define support pieces 18a. An intermediate portion arranged between the support pieces 18a is a fixed piece 18b. The support pieces 18a have support holes 18c into which the rotation shafts 20 (described later) of the open/close hinge unit 19 are fitted so that the open/close hinge unit 19 is rotatably supported.

Referring to FIG. 6, the fixed piece 18b of the open/close bracket 18 is fixed to a side plane 11b by a proper method, for example, by screwing, the side plane 11b which is a bottom plane of the housing recess 11 recessed with respect to the left side surface 2b of the apparatus body 2. Hence the open/close bracket 18 is arranged in the housing recess 11 at the apparatus body 2 such that the support pieces 18a face each other and horizontally extend.

The open/close hinge unit 19 is formed by bending a metal plate to have a substantially angular C-shaped section like the above-mentioned open/close bracket 18. Horizontally extending, upper and lower end portions of the open/close hinge unit 19 define supported pieces 19a. A vertically extending portion between the supported pieces 19a is a rotation support portion 19b. Outer edges of the supported pieces 19a are rounded. The rotation shafts 20 are integrally formed with the supported pieces 19a at center portions thereof. The rotation shafts 20 protrude toward upper and lower sides. Also, an insertion hole 21 is made at a center portion of the rotation support portion 19b. The inner diameter of the insertion hole 21 is slightly greater than the outer diameter of the shaft member 24 (described later) of the rotary unit 22.

The open/close hinge unit 19 is supported such that the rotation shafts 20 are inserted into the support holes 18c and hence the open/close hinge unit 19 is pinched by the open/close bracket 18 from the upper and lower sides in the housing recess 11. Accordingly, the open/close hinge unit 19 is horizontally rotatable around the vertically extending rotation shafts 20 (corresponding to the first rotation axis A).

The rotary unit 22 includes the base portion 23 and the shaft member 24 which are substantially cylindrical. In particular, a disk-like attachment flange 23a is integrally formed at an end of the base portion 23 of the rotary unit 22. A support hole 23b penetrates through a center portion of the base portion 23 from the end to another end and open to both sides.

The shaft member 24 (corresponding to the second rotation axis B) has an outer diameter that is slightly smaller than the inner diameter of the support hole 23b of the base portion 23, or that is allowed to be rotated within the support hole 23b (described later). The attachment bracket 25, which is like a plate and has a substantially L-like horizontal section, is integrally attached to an end portion of the shaft member 24 such that a first piece 25a is orthogonal to an axial direction of the shaft member 24, and hence the first piece 25a is like a flange. A second piece 25b of the attachment bracket 25 extends from an edge of the first piece 25a in the axial direction of the shaft member 24 and in a direction opposite to the protruding direction of the shaft member 24. An engagement groove 24a is formed in a circumferential direction of another end portion of the shaft member 24. The engagement groove 24a fixes the position of the e-ring 29 (described later).

Referring to FIG. 4, the cover body 26 is a rectangular box whose one side is open. Upper and lower wall portions 26a and 26b of the cover body 26 have notches 27 at opening edges thereof. A closed side 26c of the cover body 26 has a vertically long rectangular opening 28 at a center portion thereof.

To attach the thusly configured rotary unit 22, the shaft member 24 arranged at the attachment bracket 25 is inserted into the opening of the support hole 23b opposite to the attachment flange 23a of the base portion 23, so that the first piece 25a of the attachment bracket 25 contacts an end surface of the base portion 23.

Then, the rotary unit 22 in which the base portion 23 and the shaft member 24 are integrated is attached to the rotation support portion 19b of the open/close hinge unit 19. That is, the shaft member 24 of the rotary unit 22 assembled as described above is inserted into the insertion hole 21 formed at the rotation support portion 19b of the open/close hinge unit 19 from the side of the rotation support portion 19b, where the supported pieces 19a protrude. The attachment flange 23a contacts an opening edge of the insertion hole 21. The attachment flange 23a is fixed to the rotation support portion 19b by a proper method, for example, by screwing (not shown). Then, the e-ring 29 engages with the engagement groove 24a of the shaft member 24 protruding from the insertion hole 21 of the rotation support portion 19b, thereby retaining the shaft member 24.

Finally, referring to FIGS. 6 and 7, the cover body 26 is externally fitted to the open/close hinge unit 19 from the side where the attachment bracket 25 protrudes, so that the hinge unit 4 is substantially entirely covered with the cover body 26. Then, the rotation shafts 20 of the open/close hinge unit 19 protrude to the upper and lower sides through the notches 27 of the cover body 26, and the attachment bracket 25 at the end of the shaft member 24 of the rotary unit 22 protrudes from the opening 28.

Thusly, the open/close hinge unit 19 and the rotary unit 22 are integrated as shown in FIGS. 5 to 7. Accordingly, the attachment bracket 25 is horizontally rotatable around the rotation shafts 20 (the first rotation axis A) of the open/close hinge unit 19. Also, the attachment bracket 25 is rotatable around the shaft member 24 (the second rotation axis B) of the rotary unit 22 extending in the direction orthogonal to the rotation shafts 20.

The display unit 3 is attached to the attachment bracket 25 and supported thereby. Though not shown in detail, an attachment method may be as follows. Screw holes are formed at the first and second pieces 25a and 25b of the attachment bracket 25, and the first and second pieces 25a and 25b are respectively screwed to the frame body 13 and the rear face cover 16.

Hereinbefore, the structure of the hinge unit 4 according to this embodiment has been described with reference to FIGS. 4 to 7. With the hinge unit 4, when the display unit 3 and the hinge unit 4 are rotated together with respect to the apparatus body 2 around the rotation shafts 20 (the first rotation axis A), the display unit 3 can be opened or closed with respect to the apparatus body 2. In addition, when the display unit 3 is rotated with respect to the hinge unit 4 around the shaft member 24 (the second rotation axis B) of the rotary unit 22, the display unit 3 can be rotated (inverted) with respect to the apparatus body 2.

As described above, the hinge unit 4 couples the display unit 3 to the apparatus body 2 and supports the display unit 3 in a manner rotatable in the different two-axis directions. To detect the rotation states (open/close state and inversion state) in the two-axis directions, two mechanical switches have been provided, or a detection mechanism including two pairs of magnets and magnetic sensors has been provided in the past.

However, with the detection mechanism in the past, the structure of the periphery of the detection mechanism of a video camera may be complicated, the number of parts may increase, and a manufacturing cost may increase.

In light of this, the video camera 1 of this embodiment does not use the mechanical switch, but uses a single magnet 30 and two magnetic sensors (an open/close detection sensor 32 and an inversion detection sensor 34) as an open/close and rotation detection unit of the display unit 3, as partly shown in FIGS. 4 to 7. In the past, two the magnetic sensors and the two magnets have been used. In contrast, this embodiment uses only the single magnet 30 as a detection object for detecting the rotation states in the two-axis directions. The open/close detection sensor 32 and the inversion detection sensor 34 detect a magnetic force generated by the single magnet 30.

For example, as shown in FIGS. 4 to 7, the magnet 30 is provided at the hinge unit 4, the open/close detection sensor 32 is provided at the apparatus body 2, and the inversion detection sensor 34 is provided at the display unit 3. At this time, the magnet 30 is arranged in the hinge unit 4 at a position near the first and second rotation axes A and B but deviated from the first and second rotation axes A and B. Similarly, the open/close detection sensor 32 is arranged in the apparatus body 2 at a position near the first and second rotation axes A and B but deviated from the first and second rotation axes A and B. The inversion detection sensor 34 is arranged in the display unit 3 at a position near the first and second rotation axes A and B but deviated from the first and second rotation axes A and B.

A specific example of the arrangement is described below in detail. For example, as shown in FIGS. 4 to 7, the magnet 30 of this embodiment is attached to an inner side surface of the rotation support portion 19b of the open/close hinge unit 19 of the hinge unit 4. The attachment position of the magnet 30 is closer to the rotation support portion 19b than the first rotation axis A (for example, a rear side near the apparatus body 2), is below the second rotation axis B, and is deviated from both the first and second rotation axes A and B.

The open/close detection sensor 32 is attached to the apparatus body 2 at a position close to the hinge unit 4 (for example, near the housing recess 11 formed at the left side surface 2b of the apparatus body 2). The attachment position of the open/close detection sensor 32 is closer to the apparatus body 2 than the first rotation axis A, is below the second rotation axis B, and is deviated from both the first and second rotation axes A and B.

The inversion detection sensor 34 is attached to the display unit 3 at a position close to the hinge unit 4 (for example, near a portion where the second piece 25b of the attachment bracket 25 of the hinge unit 4 is fixed). The attachment position of the inversion detection sensor 34 is closer to the display unit 3 than the first rotation axis A, is closer to the rear surface of the display unit 3 than the second rotation axis B, and is deviated from both the first and second rotation axes A and B.

Since the magnet 30, the open/close detection sensor 32, and the inversion detection sensor 34 are arranged as described above, detection of both the open/close state and the inversion state of the display unit 3 is enabled. The principle of detection is described below in detail with reference to FIGS. 8A, 8B, 9A, and 9B. In FIGS. 8A and 8B, 9A and 9B, and 12A to 12D, reference numerals are applied to only primary components to provide simple drawings, and reference numerals of other components are omitted. However, the actual structures of the parts of the video camera 1 are similar to those shown in FIGS. 1 to 3.

As described above, the open/close detection sensor 32 and the inversion detection sensor 34 of this embodiment each are a magnetic sensor. A magnetic sensor is an element that outputs a detection signal with a voltage corresponding to a magnetic flux density (magnetic field strength) generated by the magnet 30 which is the detection object. The magnetic flux density to be detected by the magnetic sensor depends on a relative distance between the magnetic sensor and the magnet 30. The magnetic sensor outputs a high signal or a low signal as a detection signal depending on the relative distance between the magnetic sensor and the magnet 30. For example, the magnetic sensor outputs a high signal with a high voltage when the relative distance from the magnet 30 is a threshold value or smaller, and the magnetic sensor outputs a low signal with a low voltage when the relative distance from the magnet 30 is greater than the threshold value.

Since the magnet 30, the open/close detection sensor 32, and the inversion detection sensor 34 are arranged as described above, when the display unit 3 is opened or closed, or inverted with respect to the apparatus body 2, a relative distance between the magnet 30 and the sensor 32 or 34 is changed. Regarding the change in relative distance between both the components, the sensitivities and arrangements of the sensors 32 and 34 are adjusted. Accordingly, the open/close state and the inversion state of the display unit 3 can be detected.

Figure 8A:
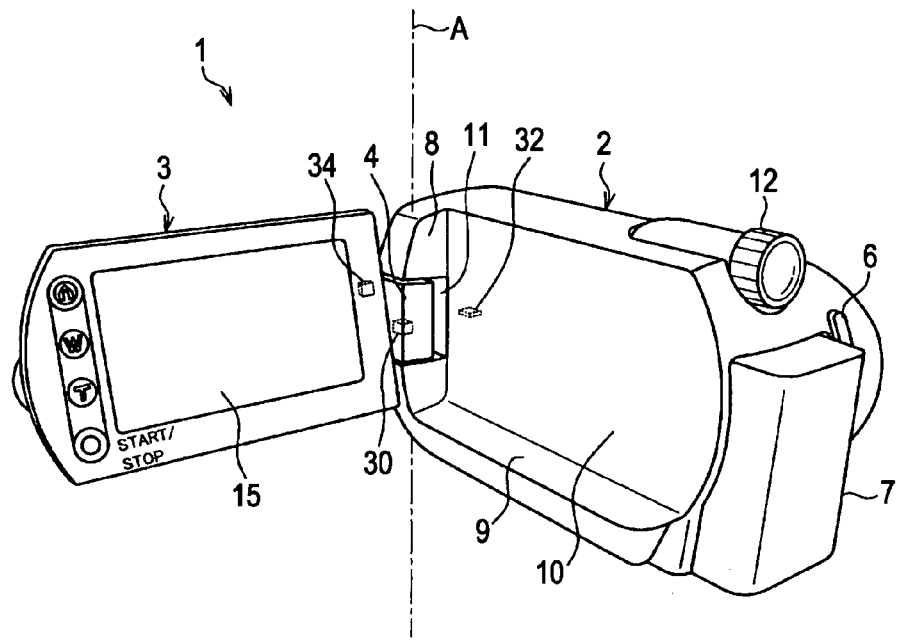
FIG. 8A is a perspective view showing the open state of the display unit of the video camera according to the embodiment.
Figure 8B:
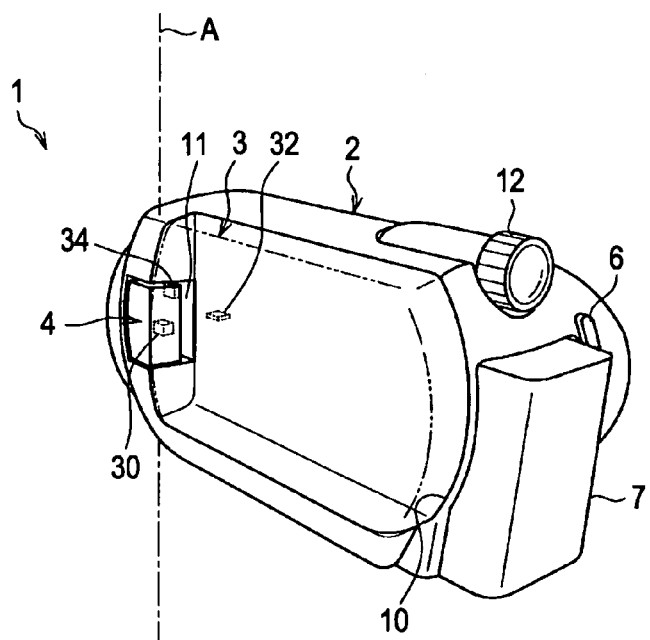
FIG. 8B is a perspective view showing the closed state of the display unit of the video camera according to the embodiment.

First, detection of the open/close state is described. FIGS. 8A and 8B are perspective views each showing a positional relationship of the magnet 30 relative to the open/close detection sensor 32 caused by opening/closing of the display unit 3. FIG. 8A illustrates the open state of the display unit 3, and FIG. 8B illustrates the closed state of the display unit 3.

Referring to FIGS. 8A and 8B, when the display unit 3 is opened or closed with respect to the apparatus body 2, the display unit 3 and the hinge unit 4 are rotated together around the first rotation axis A. The magnet 30 arranged in the hinge unit 4 is located at a position distant from the apparatus body 2 when the display unit 3 is open as shown in FIG. 8A. The magnet 30 is located at a position close to the apparatus body 2 when the display unit 3 is closed as shown in FIG. 8B.

As shown in FIG. 8A, when the display unit 3 is open, the magnet 30 arranged in the hinge unit 4 is distant from the open/close detection sensor 32 arranged in the apparatus body 2, and hence, the relative distance between the magnet 30 and the open/close detection sensor 32 is a threshold value or greater. In contrast, as shown in FIG. 8B, when the display unit 3 is closed, the magnet 30 is close to the open/close detection sensor 32, and hence, the relative distance between the magnet 30 and the open/close detection sensor 32 is smaller than the threshold value. When the display unit 3 is closed, the open/close detection sensor 32 receives a predetermined or greater magnetic force, thereby outputting the high signal. When the display unit 3 is open, the open/close detection sensor 32 receives only a magnetic force smaller than the predetermined magnetic force, thereby outputting the low signal. As described above, the open/close state of the display unit 3 can be detected by the magnet 30 and the open/close detection sensor 32.

Figure 9A:
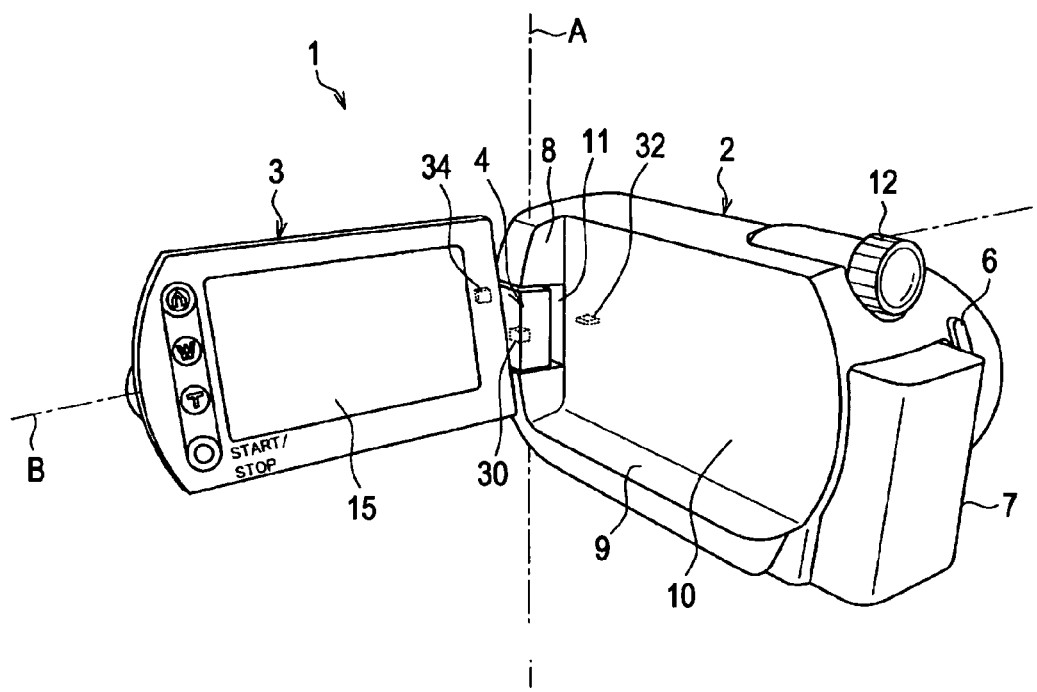
FIG. 9A is a perspective view showing a non-inverted state of the display unit of the video camera according to the embodiment.
Figure 9B:
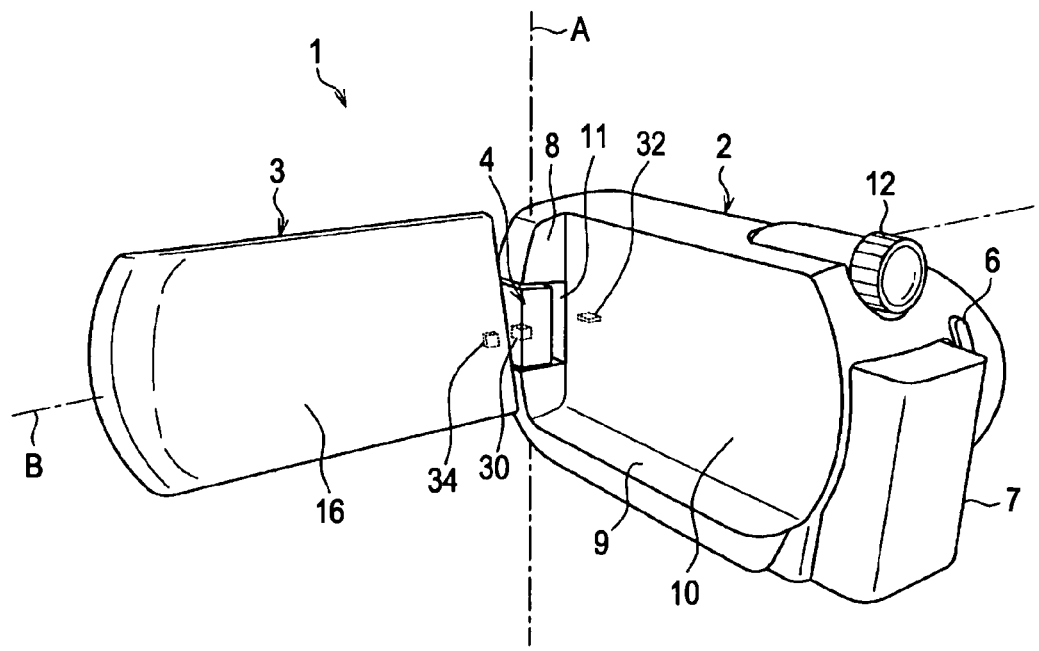
FIG. 9B is a perspective view showing an inverted state of the display unit of the video camera according to the embodiment.

Next, detection of the inversion state is described. FIGS. 9A and 9B are perspective views each showing a positional relationship of the magnet 30 relative to the inversion detection sensor 34 caused by inversion of the display unit 3. FIG. 9A illustrates the non-inverted state (normal rotation state) of the display unit 3, and FIG. 9B illustrates the inverted state of the display unit 3.

Referring to FIGS. 9A and 9B, when the display unit 3 is open, the display unit 3 is rotated around the second rotation axis B, thereby causing the display unit 3 to be in the non-inverted state (FIG. 9A) and the inverted state (FIG. 9B). As shown in FIG. 9A, when the display unit 3 is not inverted, the display panel 15 faces a near side (rear side of the apparatus). In contrast, as shown in FIG. 9B, when the display panel 15 is inverted, the display panel 15 faces a far side (front side of the apparatus). Regardless of the inverted state or the non-inverted state of the display unit 3, the magnet 30 provided in the hinge unit 4 is arranged below the second rotation axis B. The inversion detection sensor 34 provided in the display unit 3 is positioned above the second rotation axis B when the display unit 3 is not inverted as shown in FIG. 9A, and is positioned below the second rotation axis B when the display unit 3 is inverted as shown in FIG. 9B.

As shown in FIG. 9A, when the display unit 3 is not inverted (normally rotated), the magnet 30 arranged in the hinge unit 4 is distant from the inversion detection sensor 34 arranged in the display unit 3, and hence, a relative distance between the magnet 30 and the inversion detection sensor 34 is greater than a threshold value. In contrast, as shown in FIG. 9B, when the display unit 3 is inverted, the magnet 30 is close to the inversion detection sensor 34, and hence, the relative distance between the magnet 30 and the inversion detection sensor 34 is the threshold value or smaller. Accordingly, when the display unit 3 is not inverted, the inversion detection sensor 34 receives only a magnetic force smaller than a predetermined magnetic force, thereby outputting the low signal. In contrast, when the display unit 3 is inverted, the inversion detection sensor 34 receives the predetermined magnetic force or greater, thereby outputting the high signal. As described above, whether the display unit 3 is inverted or not can be detected by the magnet 30 and the inversion detection sensor 34.

Thus, the open/close state of the display unit 3 and the inverted/non-inverted state of the display unit 3 can be detected by the single magnet 30 and the two magnetic sensors (the open/close detection sensor 32 and the inversion detection sensor 34).

Such a magnetic sensor has high detection accuracy and a simple structure, is inexpensive, and reduces a man-hour for installation as compared with a mechanical switch. In addition, in this embodiment, the single magnet 30 is provided in the hinge unit 4, and the magnetic sensors 32 and 34 are respectively provided at the apparatus body 2 and the display unit 3. Accordingly, comparing with the past configuration including the two magnets and the two magnetic sensors in the hinge unit, wiring connection can be facilitated, a space occupied by the magnets and the magnetic sensors can be reduced, the apparatus structure can be significantly simplified, the number of parts can be reduced, and the apparatus can be manufactured with low cost.

Further, only the magnet 30, which does not use wiring connection, is provided in the hinge unit 4, and the open/close detection sensor 32 and the inversion detection sensor 34, which use wiring connection, are respectively provided in the apparatus body 2 and the display unit 3. Accordingly, wires respectively connecting the sensors 32 and 34 to control circuits can be shortened, thereby simplifying the wiring structure. In the past, the mechanical switch has been provided in the hinge unit, and hence, the wiring structure has been seriously complicated. However, in this embodiment, the magnetic sensors and the magnet are efficiently arranged, thereby addressing the problems caused by the complicated structure.

Next, a control system of the video camera 1 according to this embodiment is described with reference to FIG. 10. FIG. 10 is a block diagram showing a schematic configuration of the video camera 1 according to the embodiment.

Referring to FIG. 10, the video camera 1 has the structure in which the apparatus body 2 is coupled to the display unit 3 through the hinge unit 4 as described above. The apparatus body 2 includes a microcontroller 50 that is a control device to control the entire video camera 1, an image pickup device 52 that captures an image of an object, an image processor 54 that processes an image signal obtained through the image capturing, a recording/reproducing device 56 that records captured image data on a recording medium and reproduces recorded data from the recording medium, a panel driver 58 that controls the display panel 15 of the display unit 3 on the basis of an instruction of the microcontroller 50, an operation device (not shown) that receives a user input, and a display device, such as a small viewfinder 12.

In addition, the open/close detection sensor 32, which is the magnetic sensor as described above, is provided in the apparatus body 2. The open/close detection sensor 32 is connected to the microcontroller 50 via a panel open/close detection port.

The magnet 30, serving as the detection object as described above, is provided in the hinge unit 4. The magnet 30 has a size of, for example, 5.0×4.0×3.0 mm (5.0 mm magnetization), and is made of, for example, neodymium (NeFeB) with the grade of N45H.

The inversion detection sensor 34, which is the magnetic sensor as described above, is provided in the display unit 3 having the display panel 15 such as a liquid crystal panel. The inversion detection sensor 34 is connected to the microcontroller 50 via a panel rotation detection port. The shaft member 24 (see FIG. 4 etc.) of the hinge unit 4, the shaft member 24 defining the second rotation axis B, may be a hollow cylindrical member, and various wires for connecting the display unit 3 and the apparatus body 2 may be inserted through the shaft member 24. Accordingly, the wires are not twisted or broken while the display unit 3 is rotatable around the second rotation axis B.

The magnetic sensors functioning as the open/close detection sensor 32 and the inversion detection sensor 34 are semiconductor elements that output voltages when receiving predetermined or greater magnetic flux densities (for example, a few milliteslas (mT)). Such a magnetic sensor may be, for example, a magneto-resistance (MR) sensor or a hall sensor. The MR sensor is operated (outputs a voltage) by a magnetic flux density in a direction parallel to an installation plane of the MR sensor. The hall sensor is operated (outputs a voltage) by a magnetic flux density in a direction orthogonal to an installation plane of the hall sensor. To reduce the thickness of the panel-shaped display unit 3, the inversion detection sensor 34 is preferably arranged in the display unit 3 in parallel to the panel direction. In this case, the MR sensor which can detect a magnetic field in the parallel direction is preferably used.

Next, operation of the thusly configured video camera 1 is described. During image capturing of an object, the microcontroller 50 controls the image pickup device 52 and executes image capturing processing in accordance with a user operation. An image signal obtained through the image capturing processing by the image pickup device 52 is processed with predetermined image processing and then compressed and encoded by the image processor 54, and recorded on a recording medium by the recording/reproducing device 56. During image capturing or reproducing, the image processor 54 outputs an image signal (color-difference signal RGB), which is a captured image from the image pickup device 52 or a reproduced image from the recording/reproducing device 56, and a synchronization signal to the panel driver 58. When the panel driver 58 receives the image signal and the synchronization signal from the image processor 54, the panel driver 58 controls the display panel 15 so as to display the captured image or the reproduced image in accordance with the image signal under the control of the microcontroller 50.

The open/close detection sensor 32 and the inversion detection sensor 34 using the above-described magnetic sensors detect the open/close state and the inversion state of the display unit 3 as described with reference to FIGS. 8A, 8B, 9A, and 9B. When the display unit 3 is opened or closed, the relative distance between the magnet 30 and the open/close detection sensor 32 is changed. Then, the open/close detection sensor 32 reacts to the change, and outputs the high/low signal corresponding to the open/close state to the microcontroller 50. When the display unit 3 is rotated (inverted), the relative distance between the magnet 30 and the inversion detection sensor 34 is changed. Then, the inversion detection sensor 34 reacts to the change, and outputs the high/low signal corresponding to the inversion state to the microcontroller 50.

The microcontroller 50 determines the rotation state (the open/close state and the inversion state) of the display unit 3 around the first and second rotation axes A and B on the basis of the high/low signal input from the open/close detection sensor 32 and the inversion detection sensor 34. The microcontroller 50 controls a display mode of the display unit 3 in accordance with the determined result. At this time, to control the display mode, the microcontroller 50 outputs an operation instruction (for example, up/down inversion display instruction, left/right inversion display instruction, etc.) for inversion display of an image to the panel driver 58. The panel driver 58 controls the display mode of the display unit 3 on the basis of the instruction from the microcontroller 50, to provide normal display, left/right inversion display, or up/down inversion display of an image. The display panel 15 is available for RGT terminal control (image left/right inversion) and DWN terminal control (image up/down inversion). The display panel 15 displays an image of the display mode on the basis of the instruction from the panel driver 58.

Here, referring to FIGS. 11 and 12A to 12D, display mode control of the display unit 3 on the basis of the detected results of the open/close detection sensor 32 and the inversion detection sensor 34 are described.

Figure 12A:
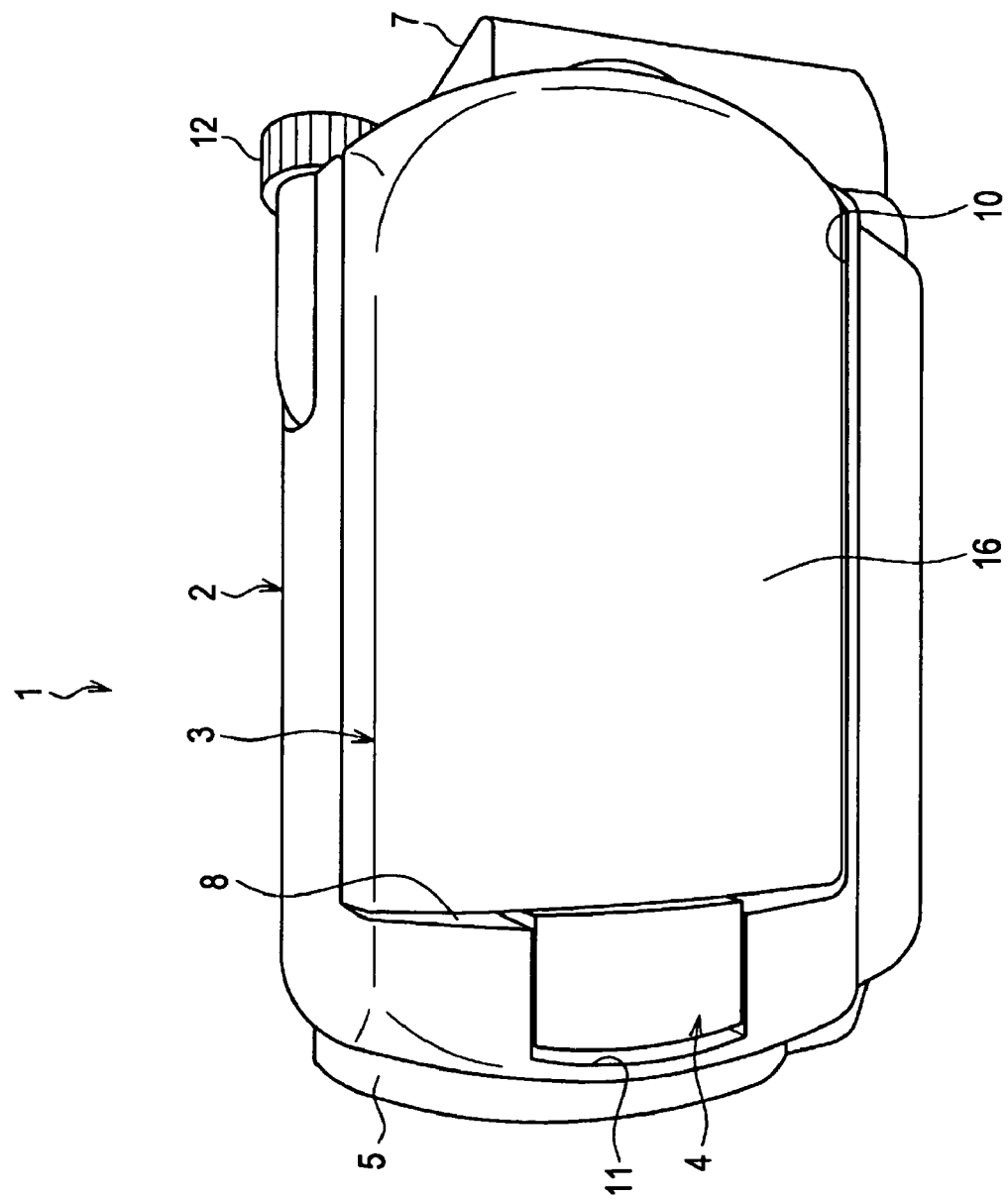
FIG. 12A is a side view showing a first state of the display unit of the video camera according to the embodiment.
Figure 12B:
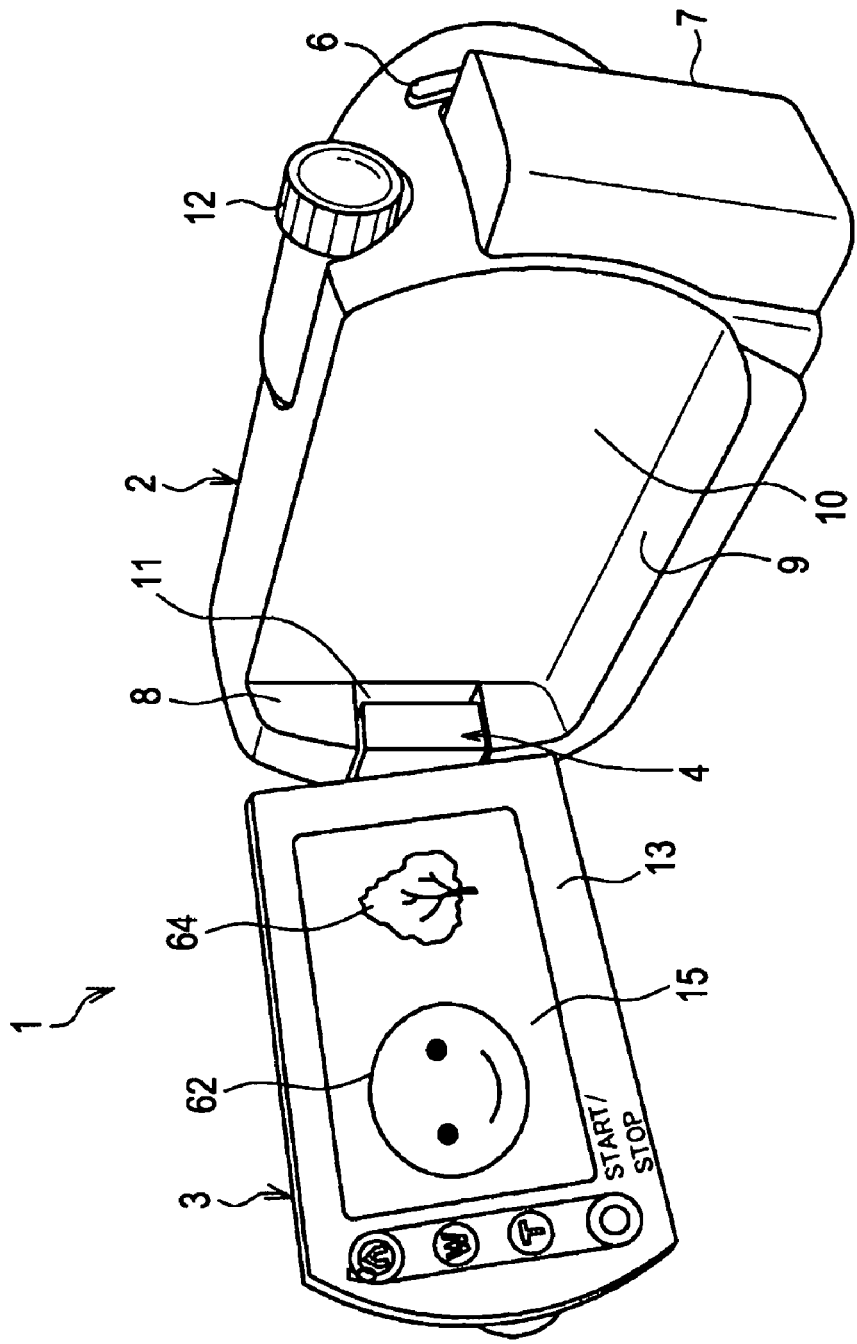
FIG. 12B is a perspective view showing a second state of the display unit of the video camera according to the embodiment.
Figure 12C:
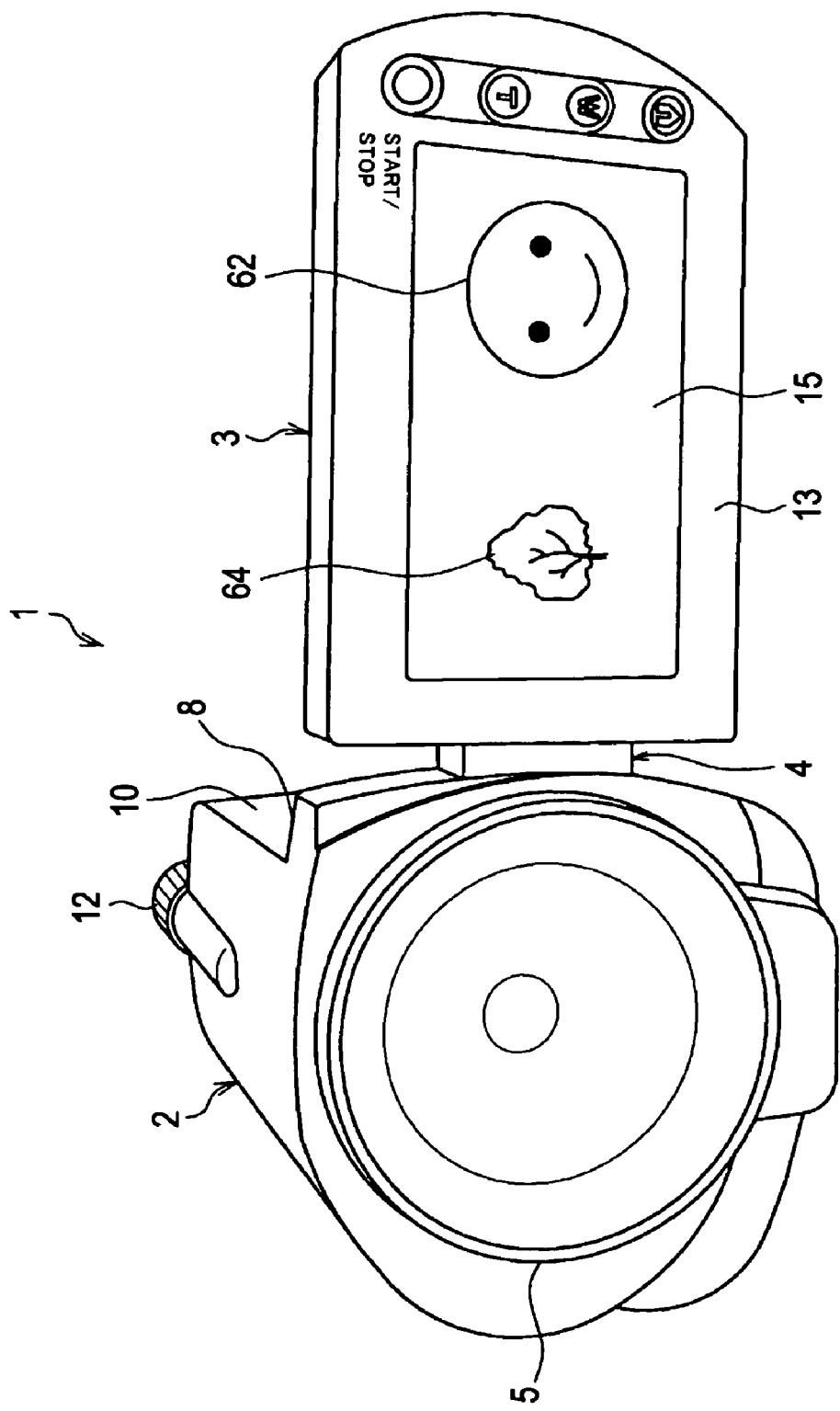
FIG. 12C is a front view showing a third state of the display unit of the video camera according to the embodiment.
Figure 12D:
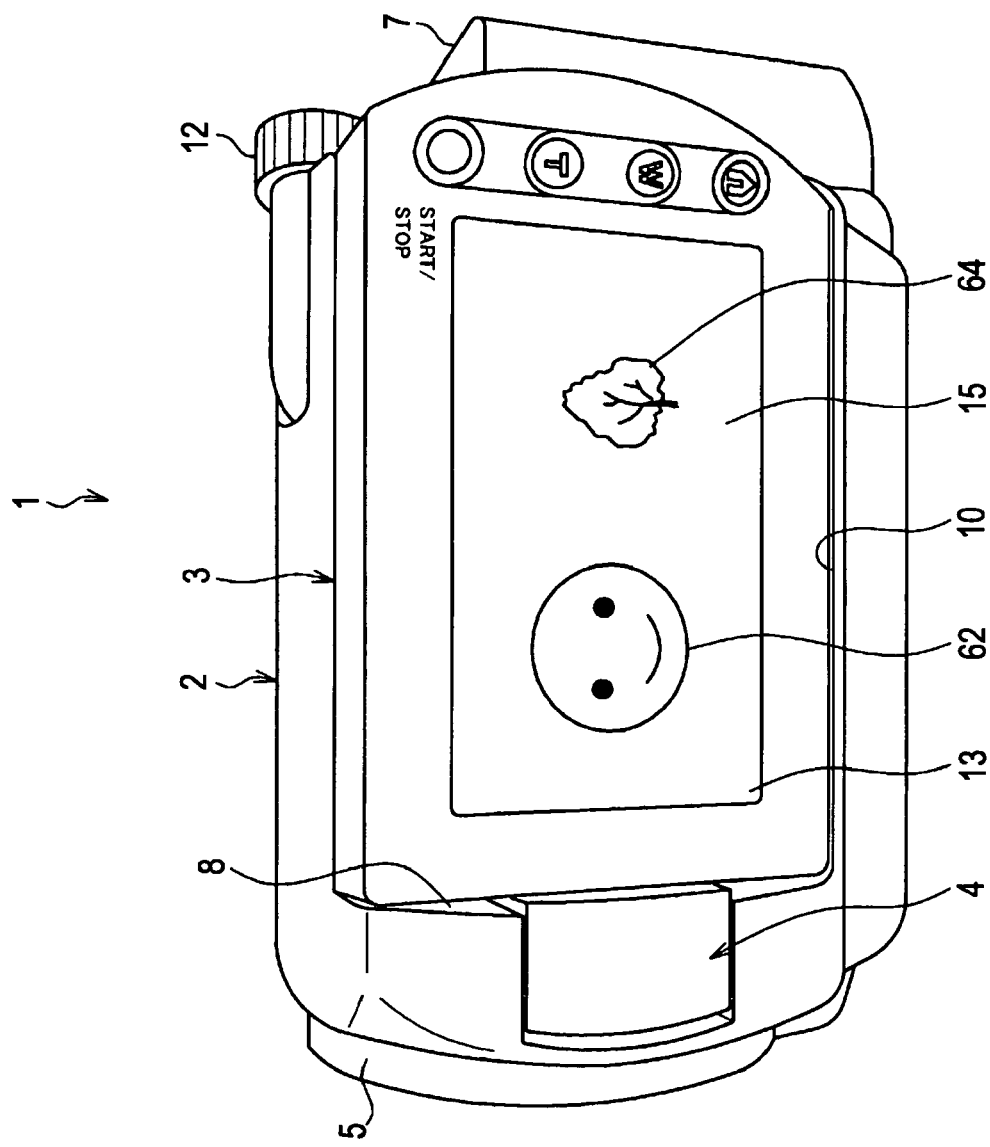
FIG. 12D is a side view showing a fourth state of the display unit of the video camera according to the embodiment.

Referring to FIG. 11, with the rotation state detection mechanism using the open/close detection sensor 32, the inversion detection sensor 34, and the magnet 30 according to this embodiment, four states (1) to (4) can be detected as rotation states of the display unit 3 around the two rotation axes A and B as follows:

(1) a first state in which the display unit 3 is closed and not inverted (see FIG. 12A);

(2) a second state in which the display unit 3 is open and not inverted (see FIG. 12B);

(3) a third state in which the display unit 3 is open and inverted (see FIG. 12C); and (4) a fourth state in which the display unit 3 is closed and inverted (see FIG. 12D).

Since the display unit 3 is closed in the first and fourth states (1) and (4), the relative distance between the magnet 30 and the open/close detection sensor 32 is small. The open/close detection sensor 32 is operated and outputs the high signal. In contrast, since the display unit 3 is open in the second and third states (2) and (3), the relative distance between the magnet 30 and the open/close detection sensor 32 is great. The open/close detection sensor 32 is not operated and outputs the low signal.

Since the display unit 3 is not inverted in the first and second states (1) and (2), the relative distance between the magnet 30 and the inversion detection sensor 34 is great. The inversion detection sensor 34 is not operated and outputs the low signal. In contrast, since the display unit 3 is inverted in the third and fourth states (3) and (4), the relative distance between the magnet 30 and the inversion detection sensor 34 is small. The inversion detection sensor 34 is operated and outputs the high signal.

The microcontroller 50 determines the rotation state of the display unit 3 around the two rotation axes A and B from the four states (1) to (4) on the basis of the detection signals (high signal(s) or low signal(s)) from the open/close detection sensor 32 and the inversion detection sensor 34. For example, the microcontroller 50 determines the rotation state as the first state when the output of the open/close detection sensor 32 is the high signal and the output of the inversion detection sensor 34 is the low signal. By combining the values of the detection signals from the open/close detection sensor 32 and the inversion detection sensor 34, the microcontroller 50 determines the rotation state of the display unit 3, and controls the display mode of the display unit 3 in accordance with the determined result. The display mode of the display unit 3 may include, for example, (a) a non-display mode, (b) a normal display mode, (c) an up/down inverted display mode, and (d) an up/down and left/right inverted display mode.

(a) In the non-display mode, the light of the display panel 15 of the display unit 3 is tuned OFF, and hence, an image (for example, a captured image or a reproduced image) provided from the apparatus body 2 to the display unit 3 is not displayed. In the non-display mode, referring to FIG. 12A, the light of the display panel 15 is turned OFF when the user closes the display unit 3 of the video camera 1 and does not view the displayed image, thereby reducing power consumption.

(b) In the normal display mode, an image (for example, a captured image or a reproduced image) provided by the apparatus body 2 to the display unit 3 is directly displayed without up/down or left/right inversion. In the normal display mode, referring to FIG. 12B, the display panel 15 of the display unit 3 displays the image with the original arrangement of the captured object (a person 62 is at a left side, and a tree 64 is at a right side, thereby displaying the actual object).

(c) In the up/down inverted display mode, an image (for example, a captured image or a reproduced image) provided by the apparatus body 2 to the display unit 3 is inverted in the up/down direction and displayed. In the up/down inverted display mode, referring to FIG. 12C, the display panel 15 of the display unit 3 displays an up/down inverted image of the object during capturing.

An example of practical use may be a situation in which the display unit 3 is inverted (rotated by 180°) around the second rotation axis B so as to show a displayed image to a user facing the front surface (the lens-5 side) of the video camera 1. In this example of practical use, referring to FIG. 12C, the up/down position of the display panel 15 is inverted. Owing to this, if the image is displayed in the normal display mode when the display unit 3 is inverted, the display panel 15 displays an up/down inverted image. The facing user feels difficulty in viewing the image. Therefore, when the display unit 3 is inverted, the display mode is switched from the normal display mode (b) to the up/down inverted display mode (c). The up/down position of the image is displayed in a correct manner. Thus, the facing user easily views the displayed image. In the image displayed in the up/down inverted display mode on the inverted display unit 3, referring to FIG. 12C, the image is displayed in an inverted manner in the left/right direction, such as when the image is reflected by a mirror (so-called mirror display). The left/right position of the object is inverted from the actual object. Thus, the person 62 is displayed at the right side, and the tree 64 is displayed at the left side. The combination of the inversion of the display unit 3 with the up/down inverted display mode is effective for, for example, self image capturing (a situation in which a user of the video camera 1 captures a self image), or face-to-face image capturing (a situation in which a user of the video camera 1 captures an image of an object facing the video camera 1 while showing the image to the object).

(d) In the up/down and left/right inverted display mode, an image (for example, a captured image or a reproduced image) provided by the apparatus body 2 to the display unit 3 is inverted in the up/down and left/right directions, and displayed. In the up/down and left/right inverted display mode, referring to FIG. 12D, the display panel 15 of the display unit 3 displays an up/down and left/right inverted image (that is, an image rotated by 180° around the center of the image) of an object during capturing.

An example of practical use may be a situation in which the display unit 3 is inverted (rotated by 180°) around the second rotation axis B to be the inverted state, and the inverted display unit 3 is rotated around the first rotation axis A to be closed, so that a plurality of users view the image while the video camera 1 is put on a desk. In this example of practical use, referring to FIG. 12D, the up/down position of the display panel 15 is inverted. owing to this, when the image is displayed in the normal display mode, the display panel 15 displays the up/down inverted image. Since it is not the face-to-face image capturing, the image does not have to be the mirror display. The left/right position of the image is preferably the same as the position of the actual object. Hence, when the display unit 3 is closed while being inverted, the display mode is switched from the up/down inverted display mode (c) to the up/down and left/right inverted display mode (d). The left/right position of the image is the same as the position of the actual object, and the up/down position is correctly displayed. Thus, the user easily views the image. In the up/down and left/right inverted display mode, referring to FIG. 12D, the display unit 3 displays the image with the original arrangement of the captured object (the person 62 is at the left side, and the tree 64 is at the right side, thereby displaying the actual object), in a manner similar to the normal display mode (b).

Hereinbefore, the four display modes (a) to (d) of this embodiment have been described. The microcontroller 50 selects the proper display mode corresponding to the rotation state in accordance with the determined result of the rotation state (one of the first to fourth states) of the display unit 3. In particular, referring to FIG. 11, the microcontroller 50 selects the non-display mode when the display unit 3 is in the first state, selects the normal display mode when the display unit 3 is in the second state, selects the up/down inverted display mode when the display unit 3 is in the third state, and selects the up/down and left/right inverted display mode when the display unit 3 is in the fourth state. With the display mode control, the microcontroller 50 outputs an operation command to instruct the display mode corresponding to the determined state to the panel driver 58 by way of, for example, serial communication. The panel driver 58 sets the display mode of the display panel 15 of the display unit 3 to the instructed mode.

Next, a change in display mode of the display unit 3 along with a series of operations of the display unit 3 by the user is described with reference to FIGS. 12A to 12D. Referring to FIG. 12A, when the display unit 3 is not inverted and closed (first state), the non-display mode is set, and hence, the light of the display panel 15 is turned OFF. In the first state, the output of the open/close detection sensor 32 is the high signal, and the output of the inversion detection sensor 34 is the low signal.

Referring to FIG. 12B, when the user opens the display unit 3 (second state), the output of the open/close detection sensor 32 is changed from the high signal to the low signal. In response to this, the microcontroller 50 changes the display mode of the display unit 3 from the non-display mode to the normal display mode. Accordingly, the display panel 15 of the display unit 3 displays a captured image or a reproduced image in the normal state.

Referring to FIG. 12C, when the user inverts the display unit 3 while the display unit is open (third state), the output signal of the inversion detection sensor 34 is changed from the low signal to the high signal. In response to this, the microcontroller 50 changes the display mode of the display unit 3 from the normal display mode to the up/down inverted display mode. Accordingly, the display panel 15 of the display unit 3 displays the captured image or the reproduced image in the up/down inverted state.

Referring to FIG. 12D, when the user closes the display unit 3 while the display unit 3 is inverted (fourth state), the output signal of the open/close detection sensor 32 is changed from the low signal to the high signal. In response to this, the microcontroller 50 changes the display mode of the display unit 3 from the up/down inverted display mode to the up/down and left/right inverted display mode. Accordingly, the display panel 15 of the display unit 3 displays the captured image or the reproduced image in the up/down and left/right inverted state.

Figure 13:
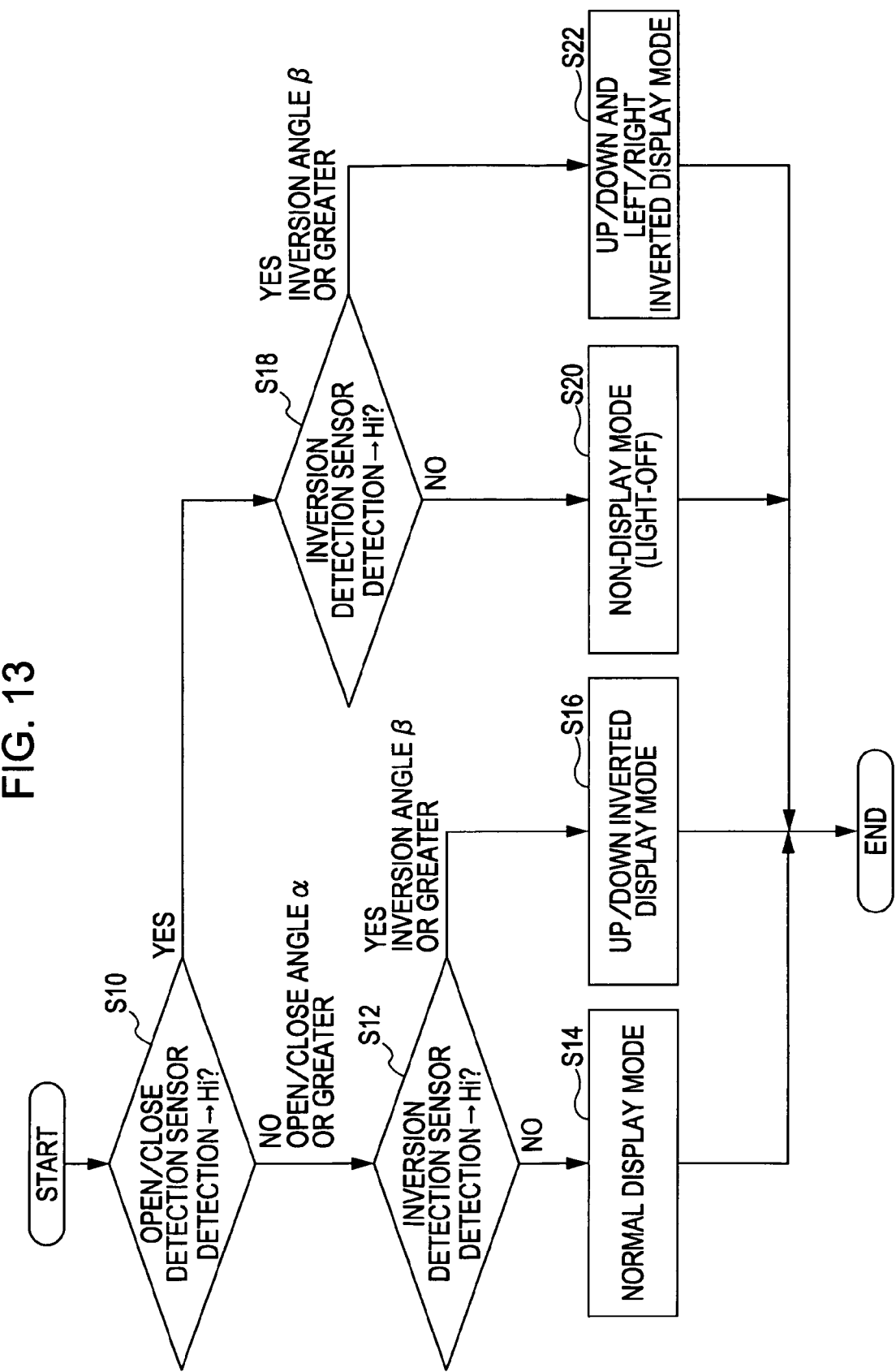
FIG. 13 is a flowchart showing display mode control of the video camera according to the embodiment.

Next, referring to FIG. 13, a procedure of the display mode control of the video camera 1 in accordance with the rotation state of the display unit 3 is described. FIG. 13 is a flowchart showing the display mode control of the video camera 1 according to this embodiment.

Referring to FIG. 13, in step S10, the microcontroller 50 of the video camera 1 determines whether the detection signal of the open/close detection sensor 32 is the high signal or the low signal (S10). If the detection signal of the open/close detection sensor 32 is the low signal, the microcontroller 50 determines that an open/close angle (that is, a rotation angle $\alpha$ around the first rotation axis A) of the display unit 3 is a predetermined angle $\alpha 0$ (for example, $\alpha 0=30°$) or greater, and hence the display unit 3 is open. Then, the procedure goes to step S12.

In step S12, the microcontroller 50 determines whether the detection signal of the inversion detection sensor 34 is the high signal or the low signal (S12). If the detection signal of the inversion detection sensor 34 is the low signal, the microcontroller 50 determines that a rotation angle $\beta$ of the display unit 3 around the second rotation axis B is smaller than a predetermined angle β0 (for example, β0=120°), and hence the display unit 3 is not inverted. Then, the procedure goes to step S14. In step S14, the microcontroller 50 sets the display mode of the display unit 3 to the normal display mode (S14). Accordingly, referring to FIG. 12B, the display panel 15 of the display unit 3 displays an image (a captured image or a reproduced image) in the normal arrangement in the same manner as the arrangement of the object.

In step S12, if the detection signal of the inversion detection sensor 34 is the high signal, the rotation angle β of the display unit 3 is the predetermined angle β0 (for example, β0=120°) or greater, and hence the display unit 3 is inverted. Then, the procedure goes to step S16. In step S16, the microcontroller 50 sets the display mode of the display unit 3 to the up/down inverted display mode (S16). Accordingly, referring to FIG. 12C, the display panel 15 of the display unit 3, which is open and inverted, displays the up/down inverted image.

In step S10, if the detection signal of the open/close detection sensor 32 is the high signal, the rotation angle α of the display unit 3 is smaller than the predetermined angle α0 (for example, α0=30°), and hence the display unit 3 is closed. Then, the procedure goes to step S18.

In step S18, the microcontroller 50 determines whether the detection signal of the inversion detection sensor 34 is the high signal or the low signal (S18). If the detection signal of the inversion detection sensor 34 is the low signal, the microcontroller 50 determines that the rotation angle β of the display unit 3 is smaller than the predetermined angle β0 (for example, β0=120°), and hence the display unit 3 is not inverted. Then, the procedure goes to step S20. In step S20, the microcontroller 50 sets the display mode of the display unit 3 to the non-display mode (S20). Accordingly, referring to FIG. 12A, the light of the display panel 15 of the display unit 3, which is not inverted and is closed, is turned OFF, and does not display an image.

In contrast, in step S18, if the detection signal of the inversion detection sensor 34 is the high signal, the rotation angle β of the display unit 3 is the predetermined angle β0 (for example, β0=120°) or greater, and hence the display unit 3 is inverted. Then, the procedure goes to step S22. In step S22, the microcontroller 50 sets the display mode of the display unit 3 to the up/down and left/right inverted display mode (S22). Accordingly, referring to FIG. 12D, the display panel 15 of the display unit 3, which is inverted and closed, displays the up/down and left/right inverted image.

Hereinbefore, the procedure of the display mode control shown in FIG. 13 has been described. With the procedure in FIG. 13, the determination step of the detection signal of the open/close detection sensor 32 (S10) is performed prior to the determination step of the detection signal of the inversion detection sensor 34 (S12, S18). However, the order of the steps may be exchanged.

Second Embodiment

Next, a video camera 1 according to a second embodiment of the present invention is described. The video camera 1 according to the second embodiment is different from the video camera 1 of the first embodiment in that a light source 70 is used instead of the magnet 30 as a detection object, and that optical sensors 72 and 74 are used instead of the magnetic sensors 32 and 34 as an open/close detection sensor and an inversion detection sensor. Other mechanisms and structures of the second embodiment are similar to those of the first embodiment, and hence, different points are mainly described below.

A control system of the video camera 1 according to the second embodiment is described with reference to FIG. 14.

Figure 14:
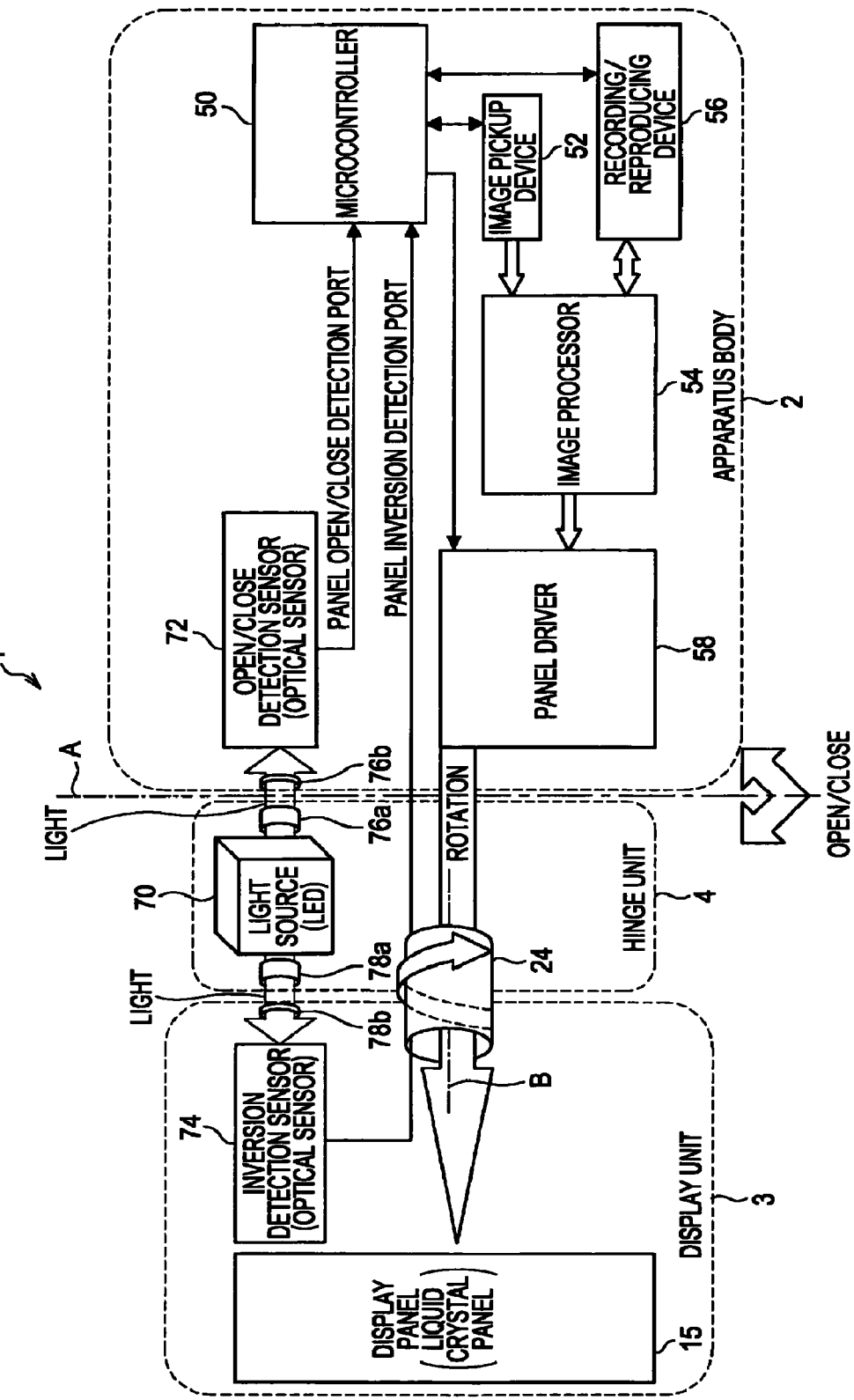
FIG. 14 is a block diagram showing a schematic configuration of a video camera according to a second embodiment of the present invention.

FIG. 14 is a block diagram showing a schematic configuration of the video camera 1 according to the second embodiment.

Referring to FIG. 14, an open/close detection sensor 72, which is the optical sensor, is provided in the apparatus body 2. The open/close detection sensor 72 is connected to the microcontroller 50 via a panel open/close detection port. Also, an inversion detection sensor 74, which is the optical sensor, is provided in the display unit 3 including the display panel 15. The inversion detection sensor 74 is connected to the microcontroller 50 via a panel rotation detection port. Further, the light source 70 as the detection object is provided in the hinge unit 4. The light source 70 is, for example, a light emitting element, such as a light emitting diode (LED).

This embodiment features that the detection object provided in the hinge unit 4 is the light source 70, and that the open/close detection sensor 72 and the inversion detection sensor 74 are the optical sensors. The optical sensors each may use a photosensor including a light receiving element such as a phototransistor. When the optical sensor receives light from the light source 70, the optical sensor outputs an electric signal with a predetermined voltage as a light reception signal. In this embodiment, the optical sensors serving as the open/close detection sensor 72 and the inversion detection sensor 74 receive light from the light source 70, so as to detect a rotation state (an open/close state and an inversion state) of the display unit 3 around the first and second rotation axes A and B.

The position of the light source 70 in the display unit 3, the position of the open/close detection sensor 72 in the apparatus body 2, and the position of the inversion detection sensor 74 in the display unit 3 are adjusted, accordingly. Light-guiding tubes 76a and 78a are provided in a casing (for example, the cover body 26 in FIG. 4) of the hinge unit 4. The light-guiding tubes 76a and 78a cause the light emitted from the light source 70 to be radiated toward the apparatus body 2 and the display unit 3. In addition, light-guiding holes 76b and 78b are respectively formed at the apparatus body 2 and the display unit 3 at positions corresponding to the open/close detection sensor 72 and the inversion detection sensor 74. The light-guiding holes 76b and 78b cause the light guided to the outside from the light source 70 through the light-guiding tubes 76a and 78a to be received by the open/close detection sensor 72 and the inversion detection sensor 74. As described above, the light-guiding tube 76a of the hinge unit 4 corresponds to the light-guiding hole 76b of the apparatus body 2, and the light-guiding tube 78a of the hinge unit 4 corresponds to the light-guiding hole 78b of the display unit 3.

For example, the position of the light-guiding tube 76a of the hinge unit 4 and the position of the light-guiding hole 76b of the apparatus body 2 are adjusted such that the light-guiding tube 76a faces the light-guiding hole 76b when the display unit 3 is completely closed (for example, α=0°). Accordingly, when the display unit 3 is completely closed (see FIGS. 12A and 12D), the light from the light source 70 enters the apparatus body 2 through the light-guiding tube 76a and the light-guiding hole 76b, and the open/close detection sensor 72 receives the light. Then, the open/close detection sensor 72 outputs a light reception signal (for example, a high signal). In contrast, when the display unit 3 is open (see FIGS. 12B and 12C), the position of the light-guiding tube 76a is deviated from that of the light-guiding hole 76b. Thus, the light from the light source 70 does not enter the apparatus body 2 through the light-guiding hole 76b. Accordingly, the open/close detection sensor 72 does not receive the light, and outputs a light non-reception signal (for example, a low signal). As described above, by using the light source 70 and the open/close detection sensor 72 which is the optical sensor, the open/close state of the display unit 3 can be detected. Alternatively, respective parts may be arranged such that the open/close detection sensor 72 receives the light from the light source 70 only when the display unit 3 is completely open (for example, α=90°).

Similarly, for example, the position of the light-guiding tube 78a of the hinge unit 4 and the position of the light-guiding hole 78b of the display unit 3 are adjusted such that the light-guiding tube 78a faces the light-guiding hole 78b when the display unit 3 is completely inverted (for example, β=180°). Accordingly, when the display unit 3 is inverted (see FIGS. 12C and 12D), the light from the light source 70 enters the display unit 3 through the light-guiding tube 78a and the light-guiding hole 78b, and the inversion detection sensor 74 receives the light. Then, the inversion detection sensor 74 outputs a light reception signal (for example, a high signal). In contrast, when the display unit 3 is not inverted (see FIGS. 12A and 12B), the position of the light-guiding tube 78a is deviated from that of the light-guiding hole 78b. Thus, the light from the light source 70 does not enter the display unit 3 through the light-guiding hole 78b. Accordingly, the inversion detection sensor 74 does not receive the light, and outputs a light non-reception signal (for example, a low signal). As described above, by using the light source 70 and the inversion detection sensor 74 which is the optical sensor, the inversion state of the display unit 3 can be detected. Alternatively, respective parts may be arranged such that the inversion detection sensor 74 receives the light from the light source 70 only when the display unit 3 is not inverted (for example, β=0°).

As described above, with the second embodiment, by using the single light source 70 and the two optical sensors, both the open/close state and the inversion state of the display unit 3 can be detected. Thus, the display mode of the display unit 3 can be controlled to the proper display mode corresponding to the open/close state and the inversion state of the display unit 3 in a manner similar to the configuration described with reference to FIG. 11. Also, a detection mechanism using the light source 70 and the optical sensors has a simple structure, is inexpensive, and is easily installed as compared with the mechanical switch.

Hereinbefore, the video cameras 1 according to the first and second embodiments of the present invention (specific examples of the display apparatus of the present invention) have been described. With any of the embodiments, using the single detection object (the magnet 30 or the light source 70) and the two sensors (the magnetic sensors or the optical sensors), both the open/close state and the inversion state of the display unit 3, which is rotatable in the two-axis directions with respect to the apparatus body 2, can be properly detected.

In the past, the two magnetic sensors and the two magnets have been necessary to detect the two rotation states. The apparatus structure may be complicated, the number of parts may increase, and the manufacturing cost may increase. In contrast, with any of the embodiments, the single detection object (the magnet 30 or the light source 70) provided at the hinge unit 4 is detected by the two sensors (the magnetic sensors or the optical sensors) respectively provided at the apparatus body 2 and the display unit 3. Accordingly, the wiring structure can be simplified, the apparatus structure can be significantly simplified, and the number of parts can be reduced. Thus, the manufacturing cost can be reduced.

Also, when the mechanical switch in the past is used, it is difficult to highly accurately detect the position of an on point or an off point of the mechanical switch. Hence, it is difficult to adjust the contact point due to a dimensional tolerance. In contrast, with any of the embodiments, a sensor (magnetic sensor, optical sensor, etc.) with higher detection accuracy, lower cost, and more simple structure as compared with the mechanical switch is used. The above-described problems can be addressed.

Further, with any of the embodiments, the microcontroller 50 determines the rotation state of the display unit 3 on the basis of the detected results of the open/close detection sensor 32, 72 and the inversion detection sensor 34, 74, and controls the display mode of the display unit 3 in accordance with the determined result. Accordingly, the display unit 3 can display an image in the proper display mode corresponding to the open/close state and the inversion state of the display unit 3. Hence, the user can view an image (a captured image or a reproduced image) which is displayed in a proper direction depending on a desired situation of practical use. This is convenient.

The preferred embodiments of the present invention have been described above with reference to the attached drawings, however, the present invention is not limited to the above-described embodiments.

For example, while the magnetic sensors or the optical sensors are used as the open/close detection sensor 32, 72 and the inversion detection sensor 34, 74, and the detection object employs the magnet 30 or the light source 70 in the above-described embodiments, the present invention is not limited to the embodiments. For example, any type of sensor and any type of detection object may be used as long as a relative positional relationship between the detection object and the sensor can be detected.

Also, the arrangement of the open/close detection sensor, the inversion detection sensor, and the detection object (magnet 30, light source 70, etc.), as well as the relative positional relationship between the detection object and either detection sensor, are not limited to the arrangement of the open/close detection sensor 32, the inversion detection sensor 34, and the magnet 30 shown in FIGS. 4 to 7, 8A and 8B, and 9A and 9B. The open/close detection sensor, the inversion detection sensor, and the magnet may be arranged at desired positions as long as the rotation state (the open/close state and the inversion state) of the display unit 3 around the first and second rotation axes A and B can be detected in accordance with the relative positional relationship between the detection object and either detection sensor. For example, the magnet 30 may not be contained in the hinge unit 4, and may be provided outside the hinge unit 4 (for example, at the outside of the casing).

In the first embodiment, it is determined that the display unit 3 is open if the distance between the open/close detection sensor 32 and the magnet 30 is great (i.e., if the detection signal of the open/close detection sensor 32 is the low signal), and it is determined that the display unit 3 is closed if the distance is small (i.e., if the detection signal of the open/close detection sensor 32 is the high signal). However, the present invention is not limited to the embodiment. For example, the arrangement of the open/close detection sensor 32 and the magnet 30 may be changed such that it may be determined that the display unit 3 is open if the distance between the open/close detection sensor 32 and the magnet 30 is small, and it may be determined that the display unit 3 is closed if the distance is great. Similarly, the inversion detection sensor 34 and the magnet 30 may be arranged in a reversed manner to the above-described embodiment, so that the relationship between the relative distance of the inversion detection sensor 34 and the magnet 30, and the determination of the inverted/non-inverted state is reversed.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
an apparatus body;
a display unit that displays an image on a display screen;
a hinge unit that couples the display unit to the apparatus body rotatably around first and second rotation axes along different directions;
a single detection object arranged at a position near the first and second rotation axes but deviated from the first and second rotation axes, and to remain fixed in position with respect to the apparatus body when the display unit is rotated around the second rotation axis;
an open/close detection sensor provided in one of the display unit and the apparatus body at a position deviated from the first rotation axis, the open/close detection sensor detecting an open/close state of the display unit around the first rotation axis in accordance with a positional relationship relative to the detection object, the display unit being opened or closed by being rotated with respect to the apparatus body; and
an inversion detection sensor provided in the other of the display unit and the apparatus body at a position deviated from the second rotation axis, the inversion detection sensor detecting, when the display unit is closed with respect to the apparatus body, whether an inversion state of the display unit is a non-inverted state, in which the display screen of the display unit faces the apparatus body, or an inverted state, in which the display screen faces a side opposite to the apparatus body, with respect to the apparatus body around the second rotation axis in accordance with a positional relationship relative to the detection object.

2. The display apparatus according to claim 1, further comprising a control device that determines a rotation state of the display unit with respect to the apparatus body around the first and second rotation axes on the basis of detected results of the open/close detection sensor and the inversion detection sensor, and controls a display mode of the display unit on the basis of a determined result.

3. The display apparatus according to claim 2, wherein the control device determines the state of the display unit from states of
a first state in which the display unit is closed and not inverted,
a second state in which the display unit is open and not inverted, and
a third state in which the display unit is open and inverted.

4. The display apparatus according to claim 3,
wherein the control device sets the display mode of the display unit to a non-display mode in which the image is not displayed when the display unit is in the first state,
wherein the control device sets the display mode of the display unit to a normal display mode in which the image is directly displayed when the display unit is in the second state, and
wherein the control device sets the display mode of the display unit to an up/down inverted display mode in which the image is inverted in an up/down direction and displayed when the display unit is in the third state.

5. The display apparatus according to claim 2, wherein the control device determines the state of the display unit from states of
a first state in which the display unit is closed and not inverted,
a second state in which the display unit is open and not inverted, and
a fourth state in which the display unit is closed and inverted.

6. The display apparatus according to claim 5,
wherein the control device sets the display mode of the display unit to a non-display mode in which the image is not displayed when the display unit is in the first state,
wherein the control device sets the display mode of the display unit to a normal display mode in which the image is directly displayed when the display unit is in the second state, and
wherein the control device sets the display mode of the display unit to an up/down and left/right inverted display mode in which the image is inverted in up/down and left/right directions when the display unit is in the fourth state.

7. The display apparatus according to claim 1,
wherein the detection object is a magnet, and
wherein the open/close detection sensor and the inversion detection sensor are magnetic sensors that detect a magnetic flux from the magnet.

8. The display apparatus according to claim 1,
wherein the detection object is a light source, and
wherein the open/close detection sensor and the inversion detection sensor are optical sensors that detect light from the light source.

9. A display apparatus comprising:
an apparatus body;
a display unit that displays an image on a display screen; and
a hinge unit that couples the display unit to the apparatus body rotatably around first and second rotation axes along different directions,
wherein the display unit is openable/closable with respect to the apparatus body when the display unit and the hinge unit are rotated together with respect to the apparatus body around the first rotation axis,
wherein the display unit can be in a non-inverted state, in which the display screen of the display unit faces the apparatus body, or in an inverted state, in which the display unit faces a side opposite to the apparatus body, when the display unit is rotated with respect to the apparatus body by rotating the display unit with respect to the hinge unit around the second rotation axis and the display unit is closed with respect to the apparatus body,
wherein a single detection object is provided at a position close to or distant from the apparatus body in accordance with opening/closing of the display unit, and to remain fixed in position with respect to the apparatus body when the display unit is rotated around the second rotation axis,
wherein an open/close detection sensor is provided in the apparatus body at a position deviated from the first rotation axis, the open/close detection sensor detecting the open/close state of the display unit in accordance with a positional relationship relative to the detection object, and
wherein an inversion detection sensor, which is moved together with the display unit, is provided at a position deviated from the second rotation axis, the inversion detection sensor detecting whether the display unit is in the non-inverted state or the inverted state in accordance with a positional relationship relative to the detection object.

* * * * *